(12) United States Patent
Kimble

(10) Patent No.: US 6,763,320 B2
(45) Date of Patent: Jul. 13, 2004

(54) DATA INPUT DEVICE FOR INDIVIDUALS WITH LIMITED HAND FUNCTION

(75) Inventor: Christopher John Kimble, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/219,559

(22) Filed: Aug. 15, 2002

(65) Prior Publication Data

US 2004/0034505 A1 Feb. 19, 2004

(51) Int. Cl.[7] .................................................. G06F 3/00
(52) U.S. Cl. ........................................ 702/182; 710/8
(58) Field of Search ........................... 702/182, 42, 47, 702/134, 138, 150, 159, 196, 172; 710/8, 12, 67, 73

(56) References Cited

U.S. PATENT DOCUMENTS 6,097,374 A * 8/2000 Howard ....................... 345/168
6,600,480 B2 * 7/2003 Natoli ......................... 345/168

* cited by examiner

Primary Examiner—Marc S. Hoff
Assistant Examiner—Edward Raymond
(74) Attorney, Agent, or Firm—Roy W. Truelson

(57) ABSTRACT

A simulated keyboard data input device for a user with limited hand function comprises a hand-worn glove having multiple sensors capable of detecting minute motion of the fingers, the minute voluntary motion being significantly less than typically required for keystrokes in a conventional keyboard. A sensor interpreter is individually configured to recognize a user's finger movements as respective keys of a keyboard. The user "types" text on the simulated keyboard by repeating those combinations of minute finger motion of which the user is capable to produce keyboard characters from the sensor interpreter. Preferably, the sensor interpreter comprises a virtual keystroke detector and a key decoder, both of which are individually calibrated.

40 Claims, 11 Drawing Sheets

DATA INPUT DEVICE FOR INDIVIDUALS WITH LIMITED HAND FUNCTION

FIELD OF THE INVENTION

The present invention relates to digital data processing, and in particular to digital data input devices for use by individuals with physical disabilities.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The reduced cost of computing and the general availability of digital computing devices has brought an explosion in the volume of information available on such devices, and in the variety of applications to which such devices are put. For some years now, inexpensive "personal computers" have been available for personal use at home or for the use of a single individual at a place of business. Increased miniaturization has made it possible to design portable "laptop" computers and personal digital assistants (PDAs). These devices, together with the prevalence of the Internet, have brought digital information and computing capabilities to the public on a mass scale.

One consequence of these developments is that individuals who, for whatever reason, lack access to computer technology, are at a disadvantage, and this disadvantage grows in significance with each passing year. For example, it is now common for colleges and universities to communicate with students concerning schedules, assignments, grades and so forth, over the Internet. In some institutions, this reliance on the Internet has reached an extent that it is difficult or impossible to complete required courses without use of the Internet, a trend which is likely to continue. Such a use of digital technology and the Internet shows signs of further expansion into high school and lower level curricula.

Despite these developments, many individuals remain either unable to perform basic tasks involving the use of a computer, or less than proficient in the performance of such tasks. There are many and various reasons for these deficiencies, not all of which are addressed herein. For some individuals, lack of computer capability is due primarily or partially to physical handicaps, which make it difficult or impossible for the individual to use conventional digital input and output devices.

Physical handicaps may assume various forms, not all of which are immediately apparent. One particular form of physical handicap which may affect the individual's ability to use a computer is limited hand motion. As used herein, limited hand motion means an inability to use the hands and fingers to the full range and extent typical of an unimpaired individual, but does not imply total paralysis of the hand. Such a handicap may be caused by repetitive strain injury, arthritis, or other cause. An individual with limited hand motion may be able to perform many or nearly all everyday tasks using his hands, such as grasping an object, turning a light switch, and so forth. Therefore, the individual may not appear to be handicapped at all. Often, the individual in question can, in fact, move the affected joints of the hand within a range which might be considered normal, but to do so is painful. In some cases, it may only be painful if done on a frequent basis, as might be involved in typing on a conventional computer keyboard. It might even be the case that susceptibility to future injury or aggravation of an underlying condition can be predicted, so that although moving the affected joints of the hand in a normal full range of motion elicits no immediate symptoms such as pain, to do so on a repetitive basis might be expected to cause or aggravate injuries.

Limited hand motion is a very common problem, yet it is often neglected in human factors planning in favor of more severe handicaps. For example, persons with no hand motion (or no hands) at all can use certain alternative special input devices, such as voice recognition or sensors attached to feet or other parts of the body. It follows that individuals with limited hand motion could use such devices as well. But such devices provide a form of input which is either slow, error prone, or in some other respect generally inferior to the conventional keyboard.

It would be desirable to provide individuals with limited hand motion with a more suitable form of input device, which is customized to their particular handicap, and which approaches or equals the conventional keyboard in input efficiency.

SUMMARY OF THE INVENTION

A simulated keyboard data input device comprises a hand motion sensing apparatus and a sensor interpreter. The sensing apparatus is preferably in the form of a glove (or pair of gloves) which fits over the hand (or hands) of a user, within which are mounted multiple sensors capable of detecting minute voluntary motion of the fingers, the minute voluntary motion being significantly less than typically required for activation of keys in a conventional computer keyboard. A sensor interpreter in a receiving digital device is configured for an individual user to recognize different finger movements or combinations of finger movements, consistent with the individual user's capability, as respective characters corresponding to the keys of a keyboard. Once the simulated keyboard input device is configured, the user "types" text on the simulated keyboard by repeating those combinations of minute finger motion of which the user is capable to produce keyboard characters from the sensor interpreter.

In the preferred embodiment, the sensor interpreter comprises a virtual keystroke detector and a key decoder. The virtual keystroke detector is preferably an algorithmic function which periodically scans the sensors and detects local deflection maxima as virtual keystrokes. The key decoder is preferably a suitably trained artificial neural network, for which the inputs are sensor data for the detected virtual keystrokes and the outputs are keyboard characters. Suitable training data for the neural network may be obtained, e.g., by requesting the user to "type" various sample texts and conforming the sensor results to the desired output. The neural network is preferably emulated by programming code executing in a programmable processor.

Preferably, the sensors in the data glove are coupled via cable to a sensor receiver, which is a small, portable special-purpose electronic device which can conveniently be worn by the user, fit in a pocket or attached to clothing, and which in turn communicates with a digital computer. The virtual keystroke detector is preferably housed in the receiver, while the key decoder neural network is implemented in programming on the digital computer. However, the sensor interpreter functions could alternatively be implemented entirely in the digital computer, on entirely in a special-purpose device such as the sensor receiver.

In one aspect of the preferred embodiment, the user wears a pair of gloves to interpret motion of all ten digits of the hands. However, in an alternative aspect, a user with use of only a single hand might wear a single glove, or gloves might be used for users with fewer than ten operative fingers. Arbitrary "chord" combinations of finger movements may be employed to obtain a desired number of keyboard characters for individuals having use of fewer than ten fingers.

A simulated keyboard input device as described herein thus provides the capability for individuals who are physically unable to use a conventional keyboard in the intended manner to nevertheless enter data in a manner similar to that of non-disabled users of a conventional keyboard, and at a level of efficiency which may in some circumstances approximate that of the non-disabled user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
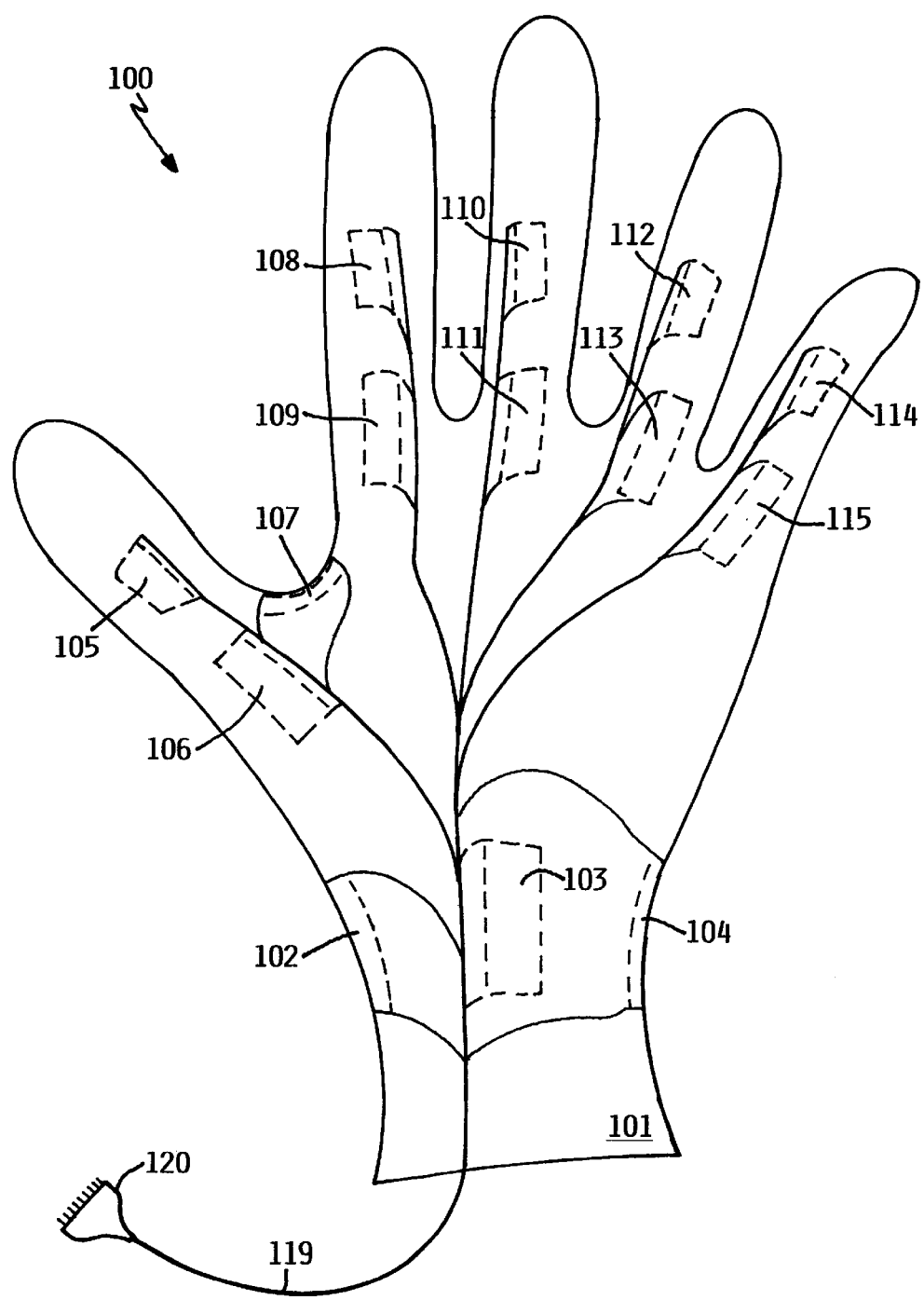
FIG. 1 is a top view of a data input glove of a simulated keyboard data input device, for the right hand of a user, the glove for the left hand being similar, according to the preferred embodiment of the present invention.

Referring to the Drawing, wherein like numbers denote like parts throughout the several views, FIG. 1 is a top view of a data input glove 100 of a simulated keyboard data input device, the glove being for the right hand of a user, the glove for the left hand (not shown) being a mirror image of glove 100, according to the preferred embodiment of the present invention. Data input glove 100 comprises a glove body 101 fitting the hand of the user. A plurality of fine motion sensors 102–115 are mounted on body 101 near the locations of various joints of the user's hand. The sensors are connected to a data cable 119 and coupling 120 for plugging into an appropriate port of a digital data device. Although glove body 101 is shown for illustrative purposes in FIG. 1 as a conventional full glove, since the function of the glove body is merely to support an house the sensors, an actual glove body may be partially open for greater user comfort; for example, glove body 101 may be open at the fingertips or palm.

In the preferred embodiment, sensors 102–115 are variable resistance strain gauges. I.e., each sensor 102–115 is a passive electrical sensor made of a thin wire using any of various suitable conductive or semi-conductive materials, which changes resistance in response to strain (bending motion) of the wire. The wire is preferably mounted on a thin, flat, flexible member for mechanical support and stability, although it might alternatively be mounted directly to glove body 101. The flexible member is mounted so that it straddles the joint of a finger or wrist, and thus bends in response to the user bending the corresponding joint. This bending of the flexible member and strain gauge wire causes a change in resistance in the wire, which can be measured by appropriate sensor electronics.

A sufficient number of sensors should be used to discriminate among the different keys. For this reason, it is recommended that a strain gauge 106, 109, 111, 113 115 be placed adjacent the joint at the base of each finger and thumb, and that a separate strain gauge 105, 108, 110, 112, 114 be placed at the middle joint of each finger and thumb. It is further recommended that several strain gauges 102–104 be placed at the wrist, and that an additional strain gauge 107 be placed between the thumb and forefinger. While this sensor arrangement is shown in the preferred embodiment of FIG. 1, it will be understood that a different number and placement of sensors might alternatively be used. As explained in further detail herein, the various sensors provide input data for a sensor interpreter (preferably a neural network), which interprets sensor data as keystrokes. A single keystroke typically causes output from multiple sensors in a characteristic pattern associated with that key. The greater the number of sensors, the greater likelihood that the sensor interpreter can reliably discriminate among different intended keys. On the other hand, a larger number of sensors also increases cost, increases the thickness of cable 119, and at some point might become noticeably uncomfortable for a user. The actual number of sensors used in any particular design will be a trade-off of these various considerations.

The purpose of the data input glove is to detect hand motion of a person who finds it difficult or impossible to move the hand to the full range of motion of a normal keyboard typist, and therefore the sensors within the glove should be able to detect small motion of the fingers, far less than typical of a normal keystroke for an unimpaired individual. Strain gauge sensors are a mature technology, having the advantage of being extremely sensitive to even minute motion of the fingers, and capable of detecting finger motion and discriminating different keystrokes even when the actual motion of the fingers is barely visible. However, strain gauge technology is not necessarily the only sensor technology which could be employed in accordance with the present invention. Any sensor technology, now existing or hereafter developed, which can detect very minute finger motion of the fingers of an impaired individual, to provide suitable input to a sensor interpreter, might alternatively be used. For example, piezo-electric pressure sensors might alternatively be suitable.

However, it should be understood that certain types of sensors sometimes used for detecting simulated keyboard finger motion would not necessarily be appropriate for use in a data input glove for individuals with limited hand function. In particular, it is expected that the user will not actually touch a key with the tip of his finger, and therefore sensors which respond to pressure at the fingertip are not necessarily useful. Similarly, acceleration or position sensors mounted near the fingertip, and which depend at least in part on the finger touching a known object, might not be useful for certain users for which the present invention is intended, since it is expected that the user may invent arbitrary finger motions to represent keys, without the need to touch any pre-defined object.

Figure 2:
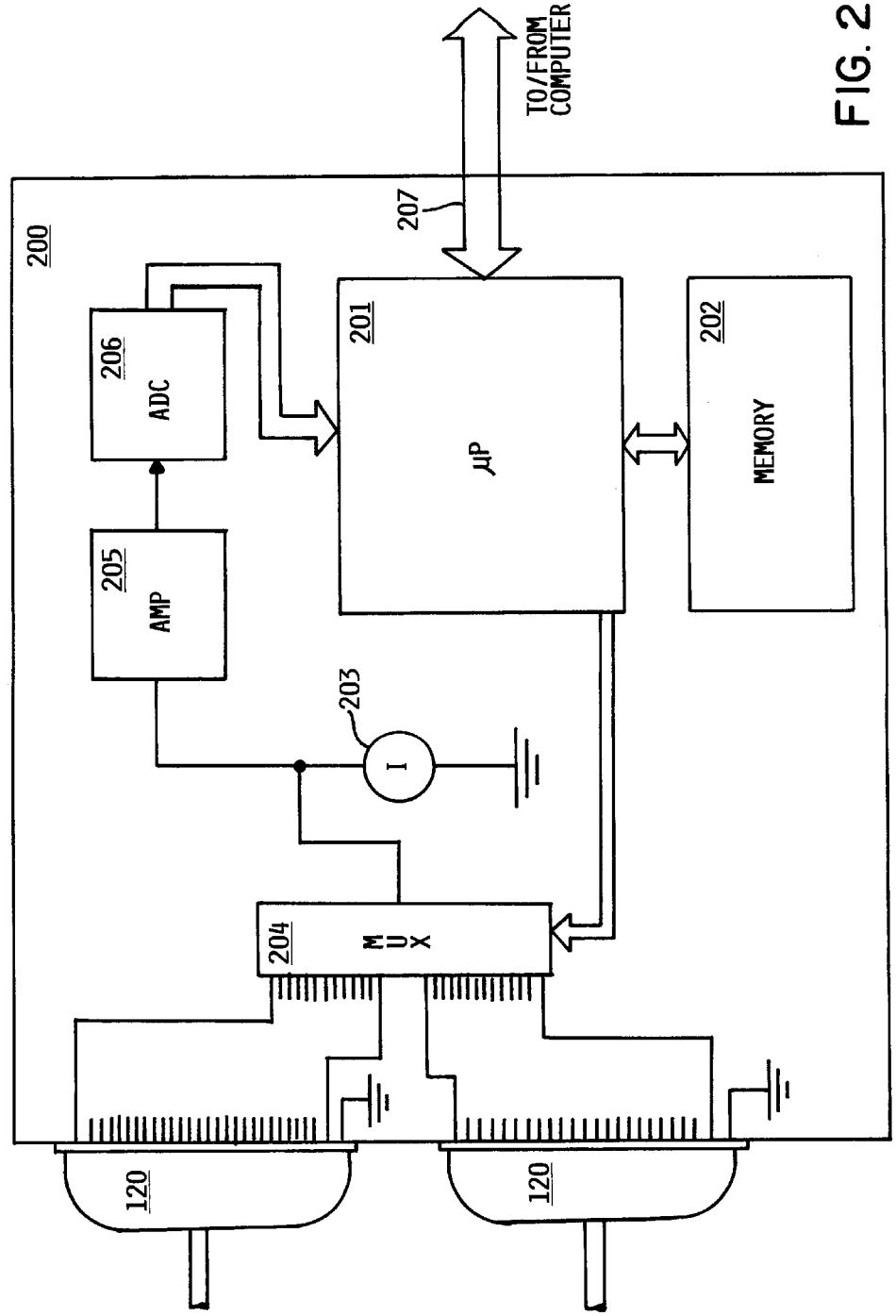
FIG. 2 shows the major internal components of a sensor receiver for a data input glove, according to the preferred embodiment.

FIG. 2 shows the major internal components of a sensor receiver 200, according to the preferred embodiment. Preferably, sensor receiver 200 is housed within a small, portable unit which can be attached to the user's clothing or body with clips, straps, necklace, or other means, into which connectors 120 from the data input gloves are plugged. In this embodiment, a single sensor receiver 200 receives sensed parameters from two data input gloves 100, one for each hand of the user. However, it would alternatively be possible to use a separate sensor receiver for each data input glove, or to provide only a single data input glove as input to the sensor receiver (e.g., in the case of a one-handed user).

As shown in FIG. 2, sensor receiver 200 contains programmable processor 201 and memory 202, in communication with each other. Processor 201 is preferably a general purpose programmable processor, which executes instructions stored in memory 202. Among other things, these instructions cause processor 201 to control the operation of sensor receiver 200 by successively determining electrical resistances of the various sensor elements within of a pair of data input gloves 100, interpreting the sensed resistances as keystrokes, and communicating keystroke data to a computing device, as described more fully herein. Memory 202 is a random access semiconductor memory which contains a control program for execution on processor 201. Memory 202 may use any of various memory device technologies, and although shown as a single monolithic entity, memory 202 may contain multiple modules of differing physical composition. In one embodiment, memory 202 comprises a non-volatile flash memory which can be written to a limited number of times, the flash memory containing the control program and various neural network configuration variables. However, memory 202 could alternatively be dynamic memory into which the control program and neural network configuration variables are loaded when the computer system is initialized, or could be some other form or combination of memory forms.

Sensing electronic components include constant current source 203, multiplexer 204, high-impedance voltage amplifier 205, and digital-to-analog converter 206, coupled as shown in FIG. 2. Multiplexer 204 is a bank of switches controlled by a multi-bit digital control signal from processor 201. Each switch within multiplexer 204 corresponds to a respective electrically conductive wire running from multiplexer 204 through connector 120 and cable 119 to a respective sensor 102–115 in a data glove 100. One end of each resistive strain gauge sensor in data glove 100 is connected to the respective line from multiplexer 204, while the other end is connected to a common ground line, which returns to sensor receiver 200 through cable 119 and connector 120. In operation, the control signal from processor 201 causes multiplexer 204 to close a single selected switch corresponding to a selected sensor, while leaving all other switches open. Constant current source 203 then drives a known constant current through the closed switch and its corresponding resistive strain gauge sensor. Because only one switch in multiplexer 204 is closed and amplifier 205 is high impedance, virtually all the current generated by current source 203 is driven through the selected strain gauge element to ground. In accordance with Ohm's Law, this generates a voltage drop across the strain gauge sensor and at the input to amplifier 205 which is proportional to the resistance of the strain gauge. Amplifier 205 responds to and amplifies this voltage drop as input to analog-to-digital converter (ADC) 206. ADC 206 converts the voltage to a digital quantity, which is input to processor 201. Processor 201 causes multiplexer 204 to cycle through all the sensor lines in sequence, to read the resistance of each sensor individually (i.e., a scan cycle).

Sensor receiver 200 further contains an external communications interface 207 for communicating with an external digital device, such as a computer. This communications interface may use any of various communications means, now known or hereafter developed. For example, communications with an external device may be by means of an attached cable using any appropriate protocol, or may be an infra-red, radio frequency, or other transmission link. If the external interface 207 is by means of a data cable, power may be provided through the cable to receiver 200. Alternatively, receiver 200 may have its own power source, such as a battery (not shown).

Figure 3:
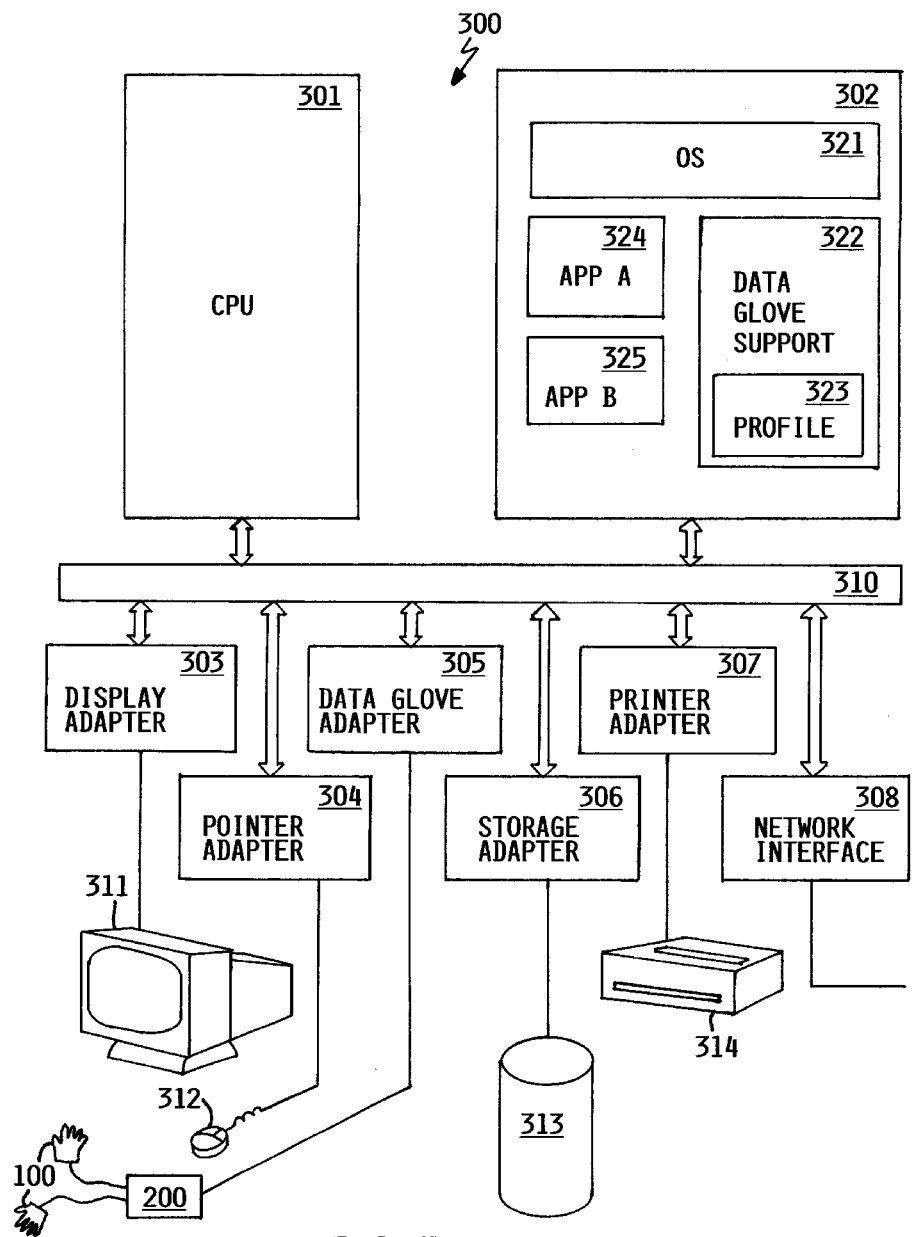
FIG. 3 illustrates a typical computer system for which data glove input device may be used to provide input, according to the preferred embodiment

FIG. 3 illustrates a typical computer system 300 for which data glove input device 100 may be used to provide input. Computer system 300 includes CPU 301, main memory 302, various device adapters and interfaces 303–308, and communications bus 310. CPU 301 is a general-purpose programmable processor, executing instructions stored in memory 302; while a single CPU is shown in FIG. 3, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communications bus 310 supports transfer of data, commands and other information between different devices; while shown in simplified form as a single bus, it may be structured as multiple buses, and may be arranged in a hierarchical form. Display adapter supports video display 311, which is typically a cathode-ray tube display, although other display technologies may be used. Pointer adapter 304 supports a pointing device 312, depicted as a mouse, it being understood that other forms of pointing device, or no pointing device at all, could be used. Storage adapter 306 supports one or more data storage devices 313, which are typically rotating magnetic hard disk drives, although other data storage devices could be used. Printer adapter 307 supports printer 314. Network interface 308 provides an interface to an external network of other computers. Such an interface may be a remote connection through the Internet, or a local area network such as an Ethernet or token ring network, or a mainframe terminal channel interface, such as might be used to connect multiple workstations to a single larger mainframe computer used as a server. The interface could be an electrical wire, fiber-optic, or other physical medium, or might be a transmission-type interface such as a radio-frequency connection. Many other types of interface are possible. Computer system 300 will typically be any of various models of single-user computer systems known as "workstations" or "personal computers". The representation of FIG. 3 is intended as an exemplary simplified representation, it being understood that many variations in system configuration are possible in addition to those mentioned here. Furthermore, a digital device which uses an input glove as described herein need not be a personal computer system, and may be a so-called dumb terminal attached to a mainframe, a notebook or laptop computer, a special-purpose device, or any of various hardware variations.

As shown in FIG. 3, a data glove adapter 305 coupled to communications bus 310 enables communications between the bus (and from it the various components of computer 300) and sensor receiver 200. As previously explained, this communications connection may be in the form of a wired cable, or may be an infrared, radio frequency, or other transmission link, using any of various protocols, as are known in the art. Since a high bandwidth is generally not required, any of various serial communications protocols should be adequate. The communications link between sensor receiver 200 and adapter 305 preferably supports bi-directional communications.

FIG. 3 represents in a conceptual manner residing within memory 302 the major software components of computer system 300. Operating system 321 provides various low-level software functions, such as device interfaces, management of memory pages, management of multiple tasks, etc. as is well-known in the art. Data glove support application 322 supports the initialization, calibration and operation of a data glove input device and associated sensor receiver, as more fully described below. Data glove support application 322 contains configuration profile 323 for storing user-specific parameters, and in particular, for storing calibrated values and parameters defining a neural network used for decoding sensor data into keystrokes. Although one configuration profile 323 is shown in FIG. 3, where system 100 is commonly used by multiple persons, it would be possible to store multiple configuration profiles in system 100, a separate profile corresponding to each different user. One of the functions of a conventional operating system is to receive user input in the form of keystrokes, and operating system 321 is accordingly configured to receive user input from the data glove which appears as user keystrokes. Data glove support application 322 is shown separate from operating system 321, although it could be part of the operating system.

In addition to data glove support application 321, one or more user applications 324, 325 executing on CPU 301 may perform any of various tasks on behalf of a user and receive data input which has been generated by a data glove input device. Such other user applications may include, e.g., word processing, accounting, code development and compilation, mail, calendaring, or any of thousands of user applications. Although two applications 324, 325 are shown for illustrative purposes in FIG. 3, the number of such applications may vary, and is typically greater.

While the software components of FIG. 3 are shown conceptually as residing in memory 302, it will be understood that in general the memory of a computer system will be too small to hold all programs and data simultaneously, and that information is typically stored in data storage device 313, comprising one or more mass storage devices such as rotating magnetic disk drives, and that the information is paged into memory by the operating system as required.

In accordance with the preferred embodiment of the present invention, a user individually configures a sensor interpreter to interpret sensed motion data from the user's hands as different keystrokes of a conventional keyboard. Preferably, interpretation of sense data is accomplished with a virtual keystroke detection algorithm and a key decoder in the form of a trainable and configurable artificial neural network, i.e., a simulated neural network embodied as computer programming code executing on a programmable processor and using configuration data to specify network parameters. Training of the neural network is accomplished by prompting the user to "type" certain data, and training the network by interpreting the arbitrary sensor output following the prompt as the desired prompted data. Once trained, the network receives sensor data and interprets it as keys, passing the keys on to the computer operating system for further use by operating system or user applications. The operation of this system is described in greater detail below.

Virtual Keystroke Detection

In a conventional keyboard, detection of a keystroke is accomplished using an electronic sensor which detects deflection of a key to some critical point. The detection of a virtual keystroke in the case of arbitrary hand motion is more complex. The user will not necessarily touch an object to indicate a keystroke; the hand will be moving in air, possibly with a motion so minute it will be difficult to observe with the eye.

In accordance with the preferred embodiment, a virtual keystroke detection program executing in the sensor receiver 200 continually scans the sensors and observes local maxima of deflection. This data is interpreted as keystrokes, although the corresponding key is not decoded at this point. When a local maximum of deflection is determined to be a keystroke, the sensor data corresponding to the local maximum is input to the neural network to decode the key. It is also necessary to detect initial activation and final release of Shift, Ctrl, Alt and similar keys.

The virtual keystroke detection program uses a concept of aggregate hand deflection, computed as follows:

$$\text{Aggregate deflection} = \Sigma K(i) \times [R(i) - R_0(i)]^2 \quad (1)$$

where K(i) is a deflection coefficient for sensor i, R(i) is the resistance of sensor (i), and $R_0(i)$ is the nominal resistance of sensor i under quiescent conditions. The change in resistance from its nominal value is squared (rather than simply taking an absolute value) to give greater weight to the sensors having the greatest change in resistance (and which are probably most indicative of the intended key), and to elevate these readings above possible noise readings from other sensors. Aggregate deflection is computed separately for each hand by summing the sensor terms for all sensors in that hand, using equation (1). Preferably, the values of K(i) are calibrated as described in greater detail herein in order to adjust to individual user capabilities. However, in a simple embodiment it would be possible to set K(i)=1 for all i, or to assume a fixed set of values of K based on an average user.

Figure 4:
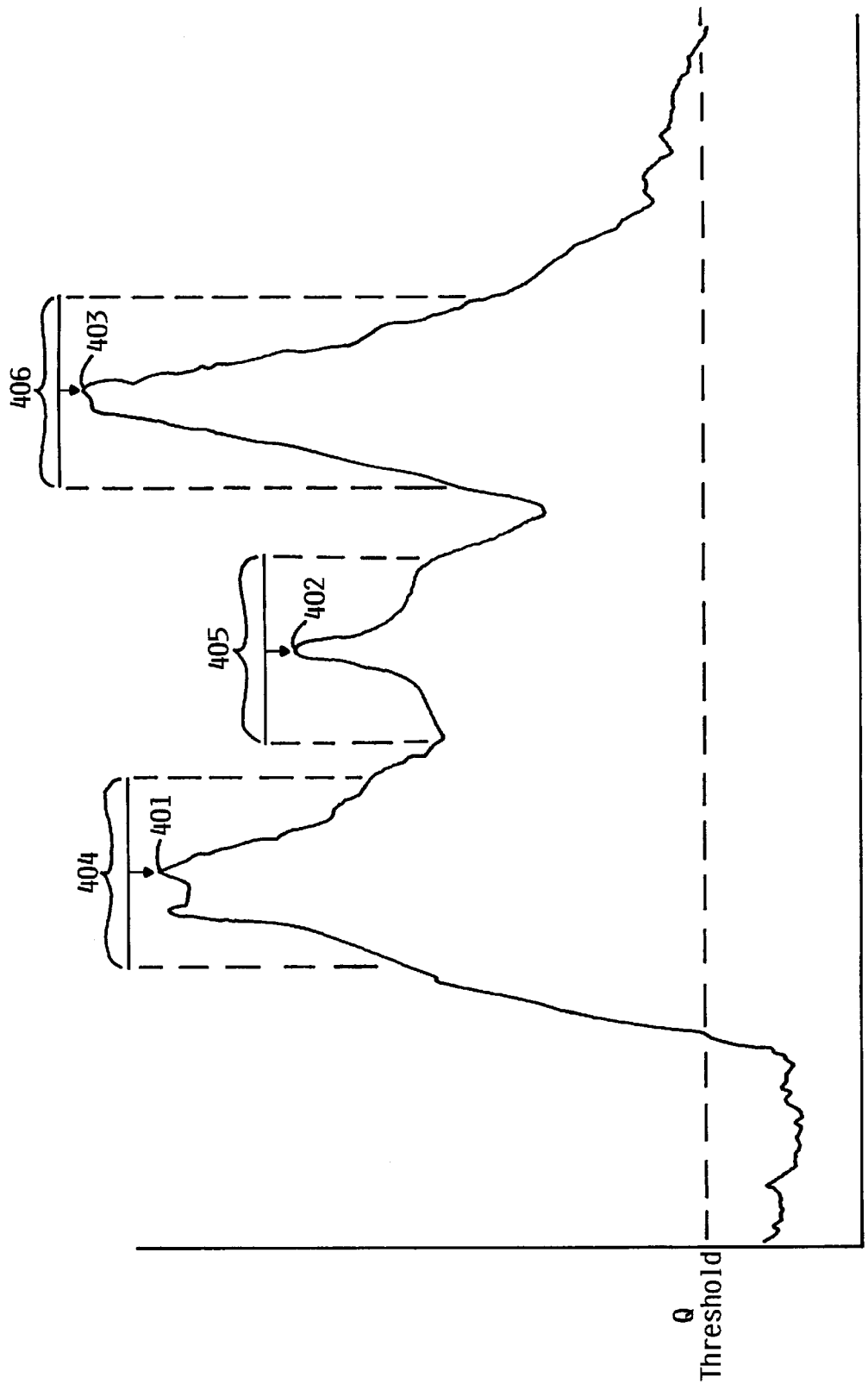
FIG. 4 illustrates a simulated measure of aggregate hand deflection over multiple scan cycles of the sensors, according to the preferred embodiment.).

FIG. 4 illustrates a simulated aggregate hand deflection curve as a function of time (multiple scan cycles). For simplicity of illustration, an aggregate deflection curve for a single hand is shown, it being understood that both hands are separately determined. FIG. 4 illustrates an activation of three distinct keys (virtual keystrokes), which are indicated by local maxima 401–403. By definition, a local maximum is an aggregate maximum for the sensors of a particular hand within a defined time window 404–406. A window which is too small may register multiple key activations where only one was intended, as a result of random vibrations or other factors. For example, referring to FIG. 4, two "peaks" are shown within window 404. If the window size were much smaller, both of these peaks might be separately detected as a "keystroke", resulting in two keys being decoded instead of one. On the other hand, a window which is too large may fail to detect some intended keystrokes which exhibit less aggregate deflection than their neighbors. Referring again to FIG. 4, if window 405 is substantially enlarged, it will eventually include scan cycles within window 404 which have greater aggregate deflection than local maximum 402, and as a result local maximum 402 will not be detected. In the preferred embodiment, the size of the window is a configuration variable which can be set to different values to accommodate different data entry rates of different users.

Figure 5A:
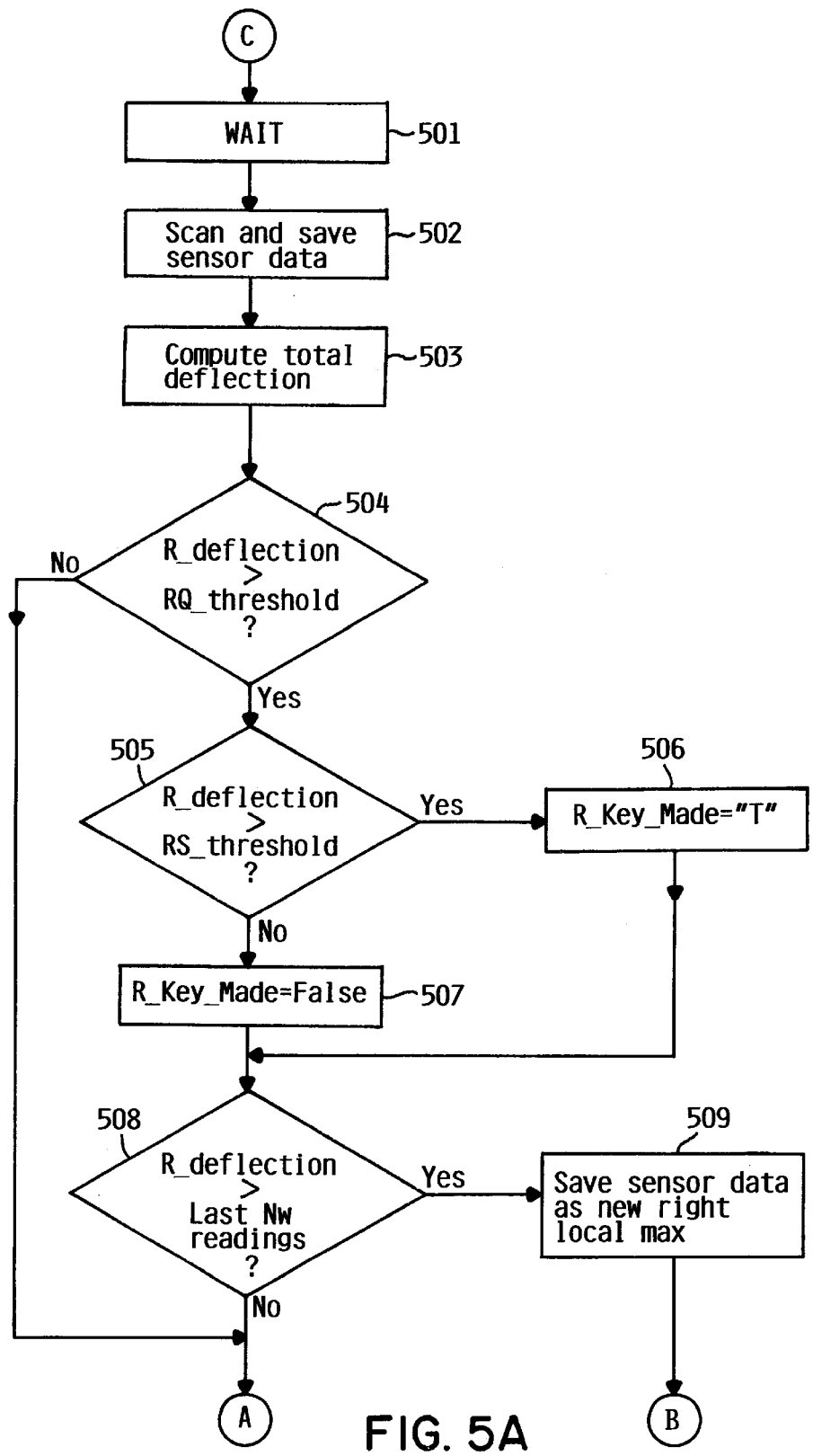
FIGS. 5A and 5B (herein referred to collectively as FIG. 5) are a simplified flow diagram illustrating the more significant steps of the virtual keystroke detection program, according to the preferred embodiment.
Figure 5B:
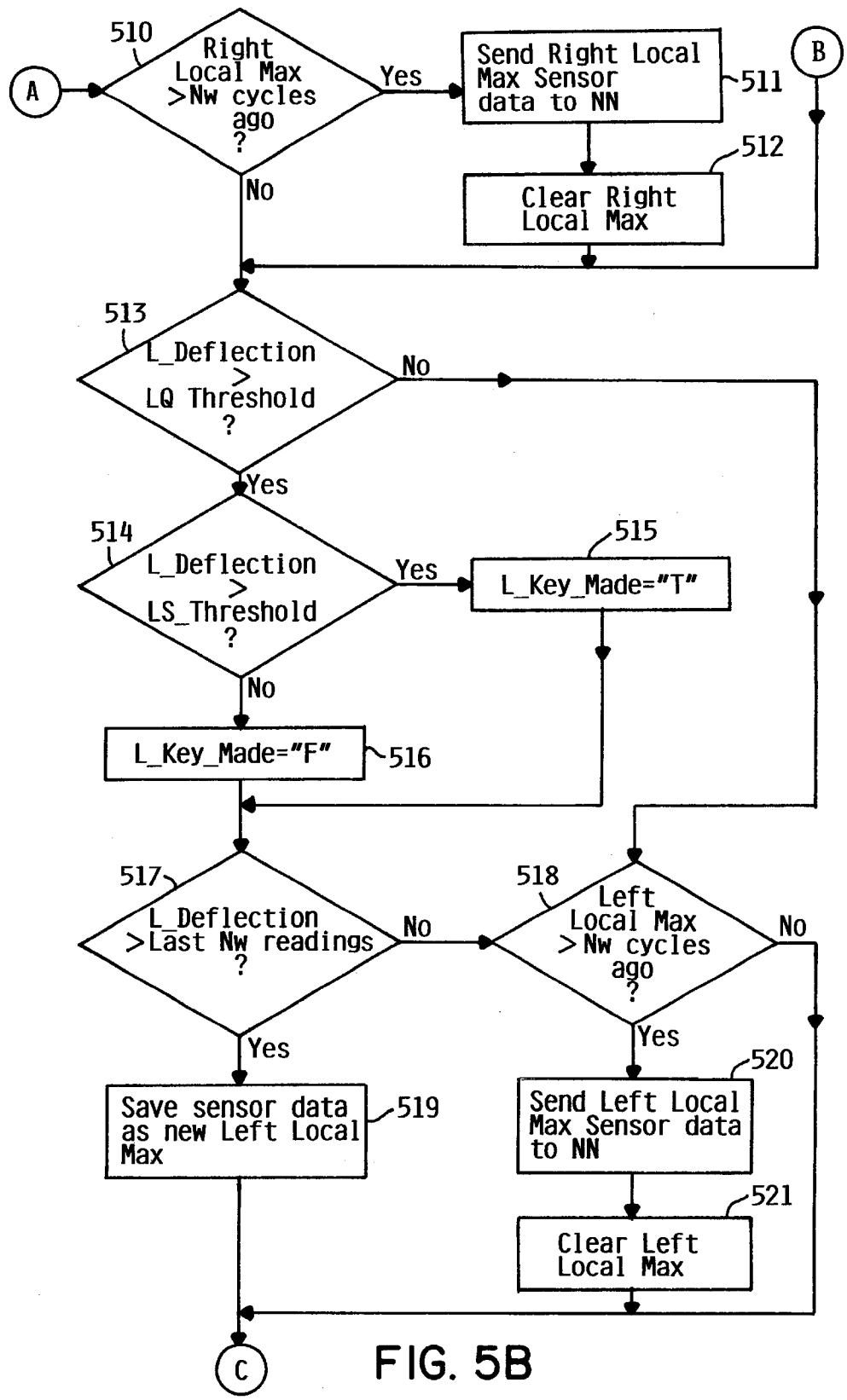

FIGS. 5A and 5B (herein referred to collectively as FIG. 5) are a simplified flow diagram illustrating the more significant steps of the virtual keystroke detection program. Preferably, the virtual keystroke detection program is enabled and disabled by an enable/disable signal (not shown). The purpose of an enable/disable signal is to avoid generating spurious input when the user is not intending to input any data. For example, the user may raise his hand to pick up the phone or a cup of coffee, and the finger movements required in doing so should not be interpreted as keystrokes by the sensor interpreter. The user may also wish to use an alternative input device, such as a mouse. An enable/disable signal can be generated in any of a variety of ways. In one embodiment, the hands are placed on a pressure-sensitive palm rest when the user wishes to "type" data, and the enable/disable signal is generated by a pressure switch in the palm rest. Other embodiments might include foot pedals, voice activations, or special key combinations for generating the enable/disable signal.

Referring to FIG. 5, when enabled the keystroke detection program waits at block 501 for the expiration of a timer indicating the start of a scan cycle. The keystroke detection program scans the resistance of the sensors (executes a scan cycle) at a scan rate sufficient to detect keystrokes with reasonable accuracy and consistent with the capabilities of processor 201 (step 502). In the preferred embodiment, a scan rate of approximately 100 scans per second (100 Hz) is used, it being understood that the scan rate might be slower or faster. For each scan cycle, the aggregate deflection for each glove is separately computed according to equation (1) as explained above (step 503).

The detection program compares the right glove aggregate deflection with a right glove quiescent threshold (RQ_Threshold), at step 504. The RQ_Threshold (and corresponding LQ_Threshold for the left glove) are intended to filter out small hand deflections not indicative of any keystroke. I.e., unless measured aggregate deflection exceeds some minimum threshold value, the sensor data is ignored and not further processed (the "No" branch from step 504). In the preferred embodiment, both the RQ_Threshold and LQ_Threshold are independently calibrated and set for the individual user.

If the RQ_Threshold is exceeded, the "Yes" branch is taken from step 504, and the detection program then compares the right glove aggregate deflection with the right glove shift threshold (RS_Threshold), at step 505. The RS_Threshold (and corresponding LS_Threshold) are intended to indicate when a shift-type key (i.e., Shift, Ctrl or Alt) is activated. These thresholds are also independently calibrated for the individual user, and are generally higher than the RQ_Threshold and LQ_Threshold, although they need not be. If the RQ_Threshold is exceeded, then the state variable R_Key_Made is set to "True" (step 506); otherwise it is set to "False" (step 507).

The detection program then examines each of the right hand aggregate deflection computations made for the last $N_W$ cycles (step 508). These values are saved in an array as they are computed, and aged out as the cycle count increases. The value of $N_W$ represents about half the width of a window 404–406 (in number of cycles) of the local maximum. By definition, an aggregate deflection value is considered a local maximum only if it is greater than all other aggregate deflection values within the window (within $N_W$ cycles before or after). If the aggregate deflection of the right hand for the current cycle is greater than the right hand aggregate deflection in any of the previous $N_W$ cycles (the "Yes" branch from step 508), then it is considered a new tentative right local maximum, and all the sensor data from the current cycle is saved as a new tentative right hand local maximum, overwriting any previously saved tentative right local max (step 509).

If a new right hand local max was not found (the "No" branch from step 508), the detection program then determines whether any previously saved tentative right hand local max aggregate deflection was detected more than $N_W$ cycles ago (step 510). If so, then no greater aggregate deflection value has been detected within a window which is $N_W$ cycles both before and after the cycle in which the tentative right hand local max aggregate deflection was detected, and this value is confirmed as a true local maximum. In this case, the "Yes" branch is taken from step 510, and the sensor data saved from the cycle in which the local max was detected is used as input to a neural network to determine which key was indicated by the user (step 511). In the preferred embodiment, this means that the sensor data for the cycle in which the local max was detected is transmitted from sensor receiver 200 to computer 300 over through interface 207 and adapter 305. The transmitted data includes the readings from each sensor of the right hand as well as the current value of L_Key_Made (which may be necessary for detecting a shift-type key) and cycle number (which is used for calibration, and may also be used for on-going training, diagnostics, or similar routines). If L_Key_Made is "true", the transmitted data further includes the most recent readings from the sensors of the left hand, which may be necessary to decode a shift key). The detection program then clears the variable storing the tentative right local max (step 512), so that no right local max is stored. If the saved tentative right local max was not saved more than $N_W$ cycles ago, or if there is not tentative right local max, then the "No" branch is taken from step 510.

The analogous steps are then performed for the left hand sensor data, i.e., steps 513–521 as illustrated in FIG. 5 are the same as steps 504–512, respectively, but apply to left hand data instead of right hand data. After processing the left hand data as indicated, the detection program returns to step 501 to await the next scan cycle.

Key Decoding

In the preferred embodiment, the key decoding function is performed by an artificial neural network embodied in software executing on CPU 301. However, many alternative embodiments of the key decoding function are possible, as discussed herein.

An artificial neural network is conceptually a directed graph of artificial neurons (also called nodes) and connections, each connection running between two nodes in a single direction, from a source node to a target node. An adaptive weight is associated with each connection. The adaptive weight is a coefficient which is applied to the output of the source node to produce a portion of the input to the target node. The input to the target node is the summation of each source output value times its respective connective weight for the connection into the target node, i.e.:

$$\text{Target\_input} = \Sigma \text{Source\_output}(i) \times \text{Weight}(i). \tag{2}$$

The target node output is some single-valued function of the target node input, i.e.:

$$\text{Target\_output} = F(\text{target\_input}). \quad (3)$$

This function can be linear or non-linear. In the preferred embodiment, a well-known sigmoid function is used, it being understood that other functions could be used.

Preferably, data glove support application 312 contains a neural network function, which uses stored parameters to construct and execute an artificial neural network. Specifically, the number of network nodes at each level, the connection weights for each connection, and the node output function, can all be stored as parameters of a particular neural network. These parameters are stored in profile 323. Upon initialization, data glove support application 312 reads stored parameters in profile 323 and "constructs" an artificial neural network according to the stored parameters. In execution, data glove support application 312 executes the neural network specified by the profile to decode the sensor input into keystrokes.

Figure 6:
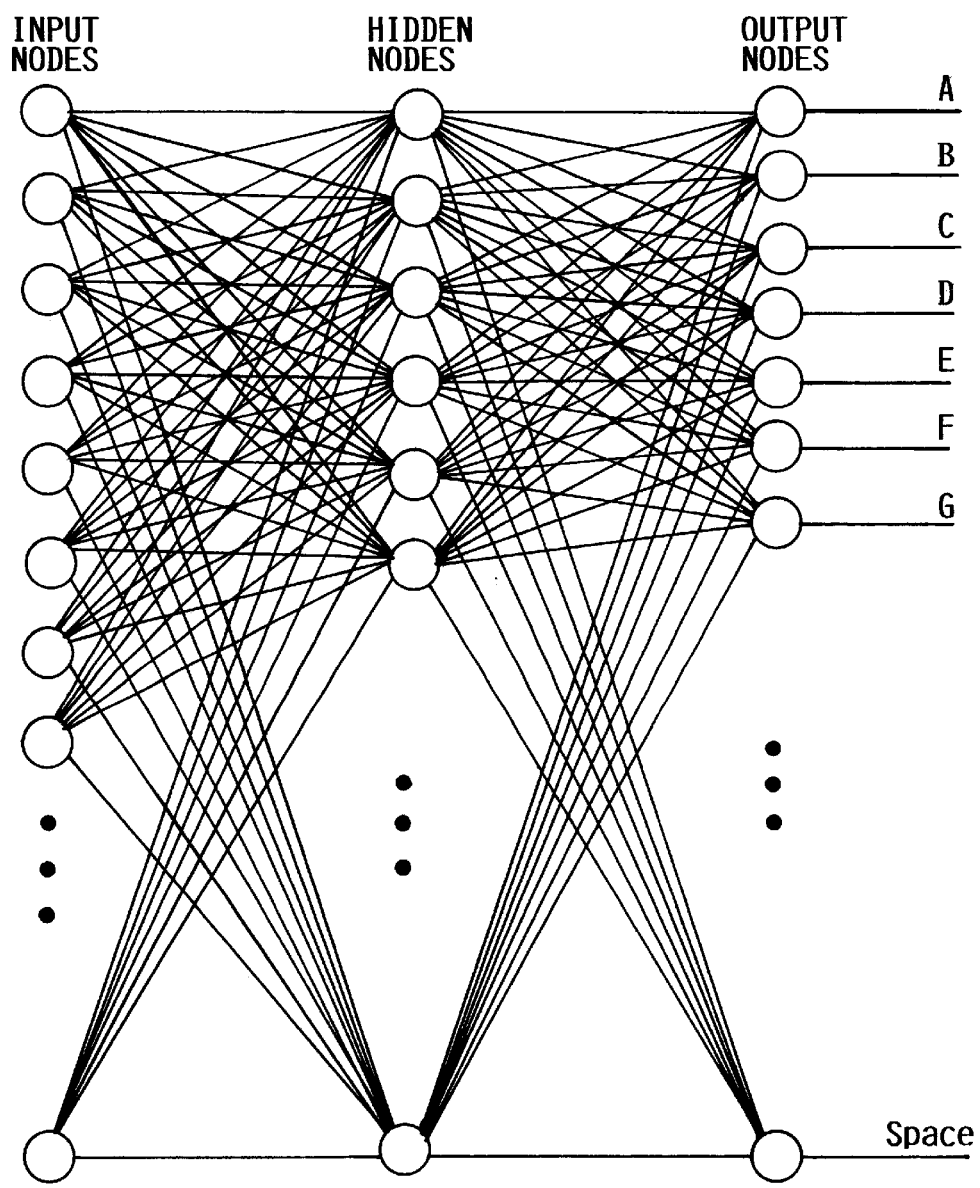
FIG. 6 is a conceptual diagram of a neural network function for interpreting sensor values as keystrokes, according to the preferred embodiment.

FIG. 6 is a conceptual diagram of a neural network function for interpreting the output of multiple strain gauge sensors from data input gloves as keystrokes, in accordance with the preferred embodiment. The network of the preferred embodiment is a fully connected, hierarchical network of three levels (also called layers), without feedback connections from a higher level node to a lower level node. This preferred network is trained using a "back propagation" algorithm and training data obtained as described herein. As shown in FIG. 6, the network comprises a number of input nodes at a first level, a number of hidden nodes at a second level, and a number of output nodes at a third level. Each input node corresponds to one of the sensors in a data input glove, meaning that there are as many input nodes as there are sensors in the data input gloves. Each input node therefore receives as input a value derived from the voltage drop across the sensor detected by amplifier 205 and converted to digital representation by ADC 206, when multiplexer 204 selects the corresponding sensor. This could be a raw value, or may be normalized in accordance with a normalization formula. Each output node corresponds to a single key of a keyboard for data input, e.g., any of the 26 characters of the alphabet, any of the ten numeric digits, or any of various punctuation or special keys, such as space bar, comma, period, and so forth.

One issue that arises is the interpretation of shift-type operations, where the user presses multiple keys simultaneously. There are several possible approaches to receiving and interpreting multiple key operations.

In theory, it would be possible to construct a neural network function having one output node for each such key combination. For example, there would be one output node for lower case "A" (the "A" key, without any other key being pressed), one for upper case "A" (Shift-A), one for the Alt-A combination, and one for the Ctrl-A combination. There may even be one for Shift-Ctrl-A, and similar multiple combinations. If these output nodes are replicated for every key on the keyboard, it will be seen that a very large number of output nodes will be required. This large number of nodes may make it difficult to properly train the network or to reliably discriminate among certain keys and key combinations. Therefore, although such an approach may be possible, it is not the preferred embodiment herein.

In the preferred embodiment, it is assumed that the primary key being activated (i.e., an alphabetic, numeric key, or symbol key) is activated with a different hand from that used for activating Shift, Ctrl, Alt or similar keys. Based on this assumption, the sensors from each hand are separately interpreted using a separate neural network function. I.e., there is a first neural network function for the left hand data input glove, having a number of input nodes equal to the number of sensors in the left data input glove (14 sensors in the illustrative embodiment of FIG. 1), and a second neural network function for the right hand data input glove, having a number of input nodes equal to the number of sensors in the right data input glove (again 14 sensors in the illustrative embodiment). The number of output nodes in each neural network corresponds roughly to the number of keys on each respective half of a keyboard. Because either hand may activate a Shift, Ctrl or Alt key while the other hand is activating an alphabetic, numeric or symbol key, both neural networks have output nodes for Shift, Ctrl and Alt. There may also be an output node for each multiple shift-type key combination, e.g., for Shift-Alt, for Ctrl-Alt, for Shift-Ctrl, and even for Shift-Ctrl-Alt. Assuming the four rows of keys of a standard keyboard or typewriter, without a row of function keys, numeric keypad, or similar, each neural network will have approximately 30 output nodes, which is much more manageable than the several hundred nodes required if a separate output node is used for each possible key combination. The number of hidden nodes for this embodiment would be approximately 20 in each network.

For example, in one rather minimal output embodiment, corresponding to a typical "QWERTY" keyboard arrangement, the following key output nodes are assigned to the left hand neural network:

1, 2, 3, 4, 5, Q, W, E, R, T, A, S, D, F, G, Z, X, C, V, B, Tab, Shift, Ctrl, Alt, Shift-Alt, Ctrl-Atl, Shift-Ctrl, Cursor (28 nodes)

And the following to the right hand neural network:

6, 7, 8, 9, 0, Y, U, I, O, P, H, J, K, L, semi-colon, N, M, comma, period, /, Enter, Space, Shift, Ctrl, Alt, Shift-Alt, Ctrl-Atl, Shift-Ctrl (28 nodes)

It will be observed that, in the interests of reducing the total number of output nodes, certain keys present on many computer keyboards (e.g., "Caps Lock") are missing. It will be appreciated that these characters or functions can easily be formed using various combinations of Shift, Alt and Ctrl keys. One additional "key", not found in standard keyboard, is used, that being the "Cursor" key for the left hand. In this embodiment, "Cursor" is effectively a Shift-type key which makes the right hand function as a cursor control. For example, with "Cursor" pressed, the keys "I" or "O" would correspond to cursor up, the keys "H" or "J" to cursor_left, the key ";" to cursor_right, and the keys "," or "." to cursor_down. Since none of the keys necessarily has a physical location, the user may invent any comfortable and distinctive motion to represent "Cursor". E.g., the user could make a fist with the left hand (or come as close to it as the user's disability permits) to signify the "Cursor" key. Of course, it will be understood that the output key assignment above is just one possible output key assignment, and that it would be possible to add output nodes corresponding to any or all of the omitted keys normally present on a keyboard, or to use fewer output nodes and a greater number of Shift/Alt/Ctrl key combinations.

There are various additional alternative techniques for handling shift key combinations. One is to constrain the user to press only one key at a time, and to make all shift-type keys behave in a toggle-on, toggle-off mode, similar to the "Caps Lock" key. Another alternative is to provide auxiliary input means for the shift-type keys, such as foot pedals. Neither technique is ideal, but they would reduce the number of output combinations seen at any one time, and may therefore help to improve key discrimination. Additionally, some disabled users may find it difficult to activate multiple keys simultaneously, so that the use of toggle modes or foot pedals may be easier for these individuals.

If a virtual keystroke is detected (say, with the right hand), the sensor data for the right hand is input to the corresponding right hand neural network, and the output of the neural network indicates the key depressed. If the key decodes as a Shift, Alt, Ctrl or Cursor, it is ignored. If the value of L_Key_Made is false, then the key is assumed to be ordinary lower case. If the value of L_Key_Made is true, then a shift condition may be present, although it is also possible that a different non-shift key is being activated with the left hand. Where L_Key_Made is true, the left hand sensor data is sent by the sensor receiver to computer 300, and is input to the left hand neural network for decoding. If the decoded key for the left hand is a Shift, Alt, Ctrl or Cursor, then the key decoded for the right hand is modified accordingly (e.g., if a Shift key is decoded for the left hand, upper case is assumed for the right hand). If the decoded key for the left hand is anything else, it is ignored; in this case, it is proper to use the data from cycle in which the left hand deflection is at a local maximum for best determination of the key being depressed.

The output of each respective node of the neural network is a floating-point value, typically normalized between 0 and 1, where 1 indicates "true" (i.e., that the corresponding key matches the data), and 0 indicates false. Ideally, for a set of inputs, one of the outputs will be 1, while all others are 0. In reality, outputs are less than ideal, and so a suitable threshold for the output is chosen (e.g., 0.7), whereby if the output of a node exceeds the threshold, it is assumed that the key corresponding to that node is the intended key. It is possible that for some inputs, no value will exceed the threshold. In this case, the system may provide some error feedback (such as an audible beep), or may simply take no action. It is remotely possible that multiple output nodes will exceed the threshold, but this fact would tend to indicate a poorly designed or trained neural network. If multiple output node values exceed the threshold, the system could simply choose the output with the highest value, or choose to ignore all outputs. An optional error feedback could be provided as well. It is expected that the system will not perfectly interpret the user's intended key in every case, but no input device is capable of that; even the trained touch typist makes mistakes on a conventional keyboard.

Calibration and Training

As explained above, the sensor interpreter is customized to the individual user by calibrating the virtual keystroke detector and training the neural network key decoder. In the preferred embodiment, this is accomplished as a multi-stage process, in which the user progressively performs keystroke exercises of increasing difficulty and under increasingly realistic conditions. Specifically, the user, responsive to system prompts, inputs in the following order: (a) single keystrokes; (b) shifted keystrokes; (c) short words; and (d) sample text, such as a paragraph.

Figure 7A:
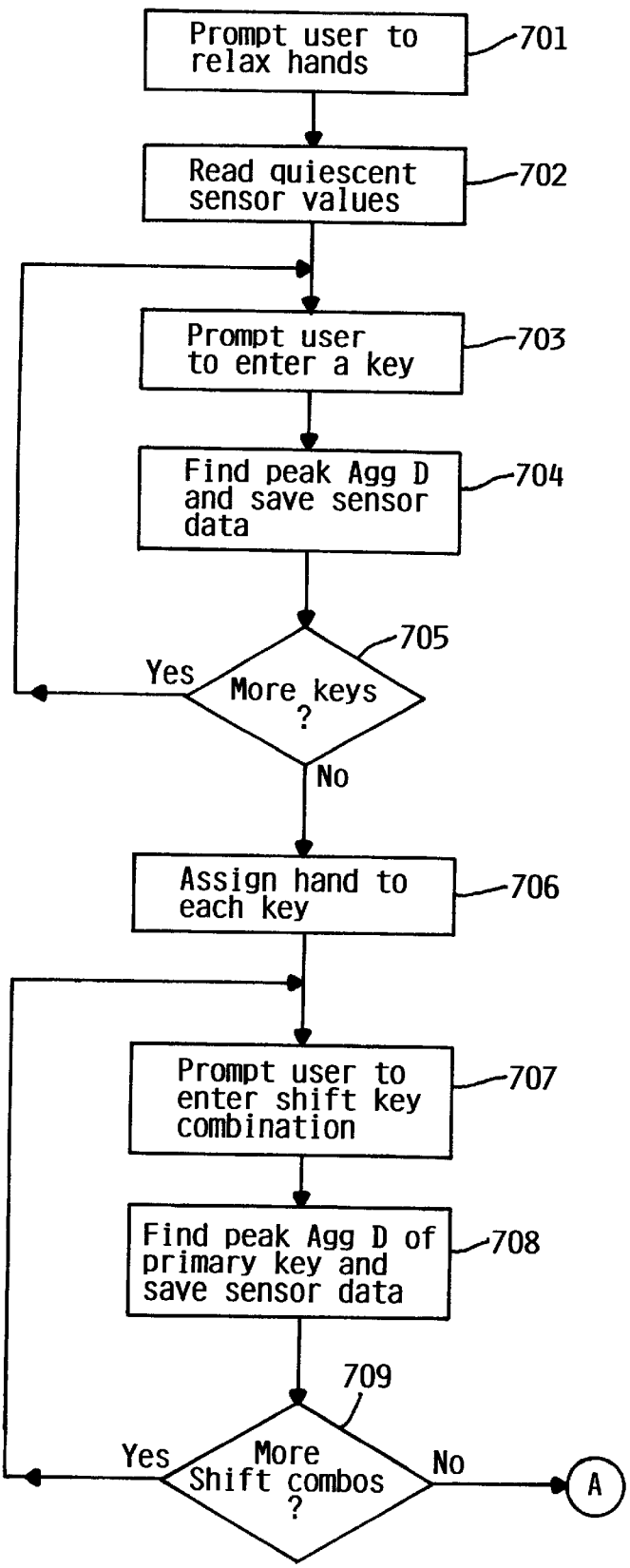
FIGS. 7A, 7B and 7C (herein referred to collectively as FIG. 7) are a high-level flow diagram of the steps involved in calibrating and training the sensor interpreter, according to the preferred embodiment.
Figure 7B:
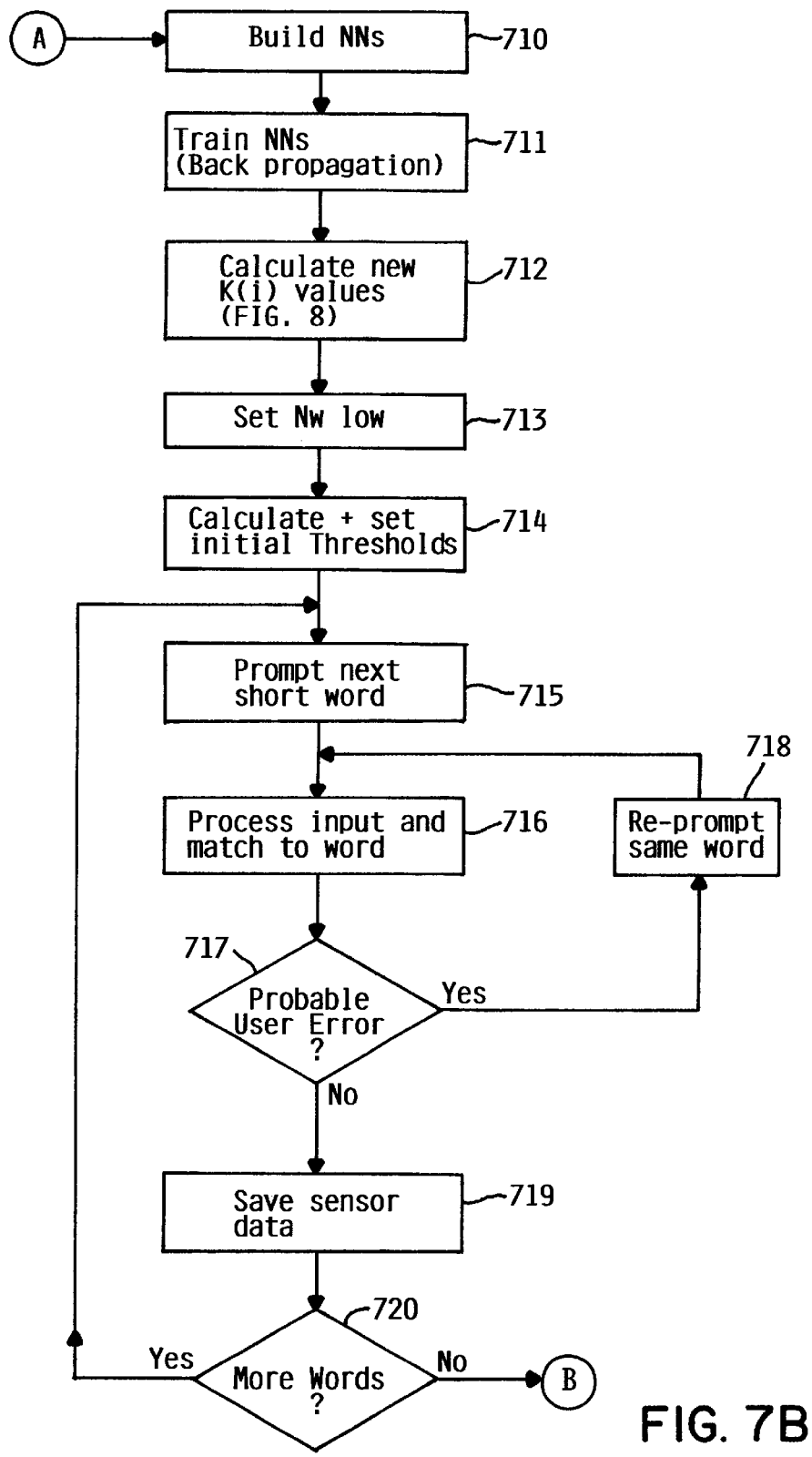
Figure 7C:
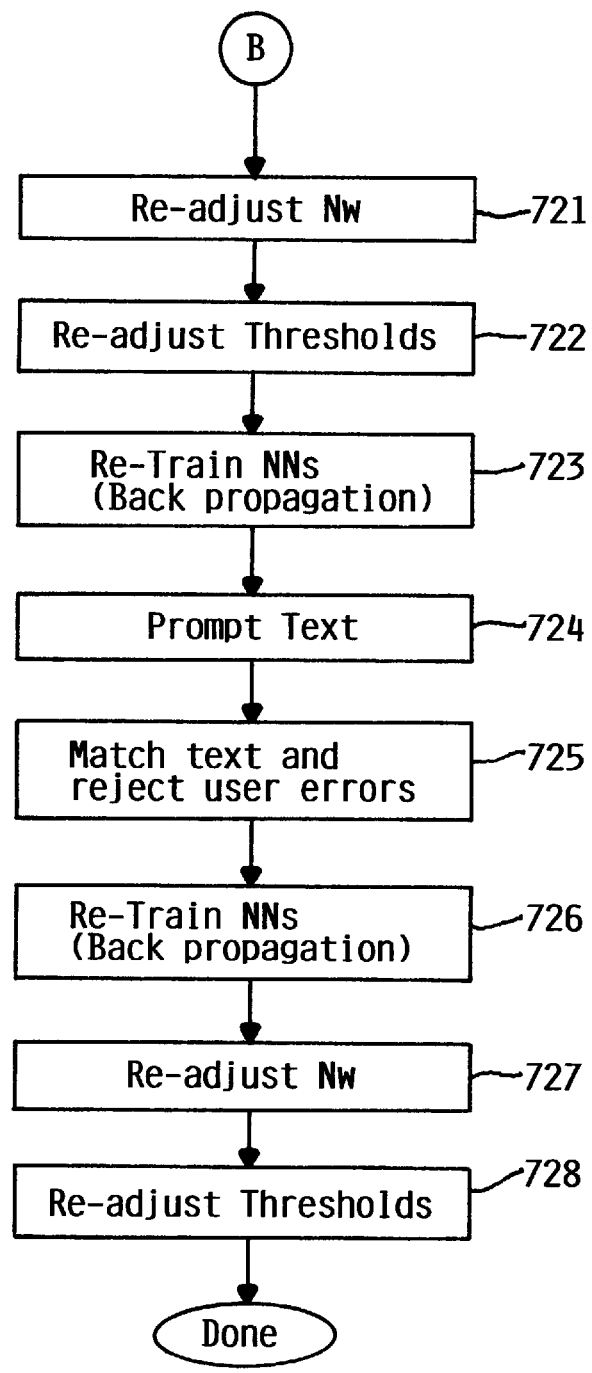

FIGS. 7A, 7B and 7C (herein referred to collectively as FIG. 7) are a high-level flow diagram of the steps involved in calibrating and training the sensor interpreter, according to the preferred embodiment. It is initially assumed that all assignment of keys to fingers is arbitrary, and that even the assignment of a particular key to a particular hand can not be assumed. However, it is initially assumed that a 2-handed configuration will be used, in which shift-type keys are available for both hands, and always activated with the hand opposite the hand activating a primary key. For one-handed operation, different assumptions regarding shifting may be used.

Referring to FIG. 7, a calibration routine which is part of data glove support application 312 first prompts the user to relax the hands in a position ready for data entry for about 15 seconds (step 701). The sensors are periodically read with the user's hands relaxed, and the average of each individual sensor computed, in order to obtain $R_0(i)$, the resistance of each sensor under quiescent conditions (step 702). A determination of quiescent sensor values is a precondition for all subsequent calibration steps.

The calibration routine then prompts the user to input individual keys (without shifting), one at a time. These key prompts are given slowly and in a random order, allowing the user ample time to input the key and relax the hand before giving the next prompt. Each key is prompted at least once, although the calibration routine may prompt each key several times. Shift-type keys are not prompted at this stage. As shown in FIG. 7, a key is selected and prompted by the system (step 703). When a key is prompted, the sensor receiver scans the sensor data at the scan rate described above with respect to step 502 and computes aggregate deflection of each hand as described with respect to step 503. However, since a value of $N_W$ (window size) has not yet been established and it is assumed the user will press only one key at the prompt, the sensor receiver simply saves sensor data for the cycle having highest aggregate deflection in the prompt interval (step 704). This is done separately for each hand. The hand having the highest aggregate deflection in the prompt interval is assumed to be the hand activating the primary key. The sense data for this hand is saved by the calibration routine for use in training the neural network key decoder. If more keys remain to be prompted (step 705), the calibration routine returns to step 703 to select and prompt another key. When the first phase is finished (all single keys have been prompted), the "No" branch is taken from step 705.

It will be observed that the algorithmic steps followed by the sensor receiver during single-key calibration are essentially the same as those described above and depicted in FIG. 5, if it is assumed that RQ_Threshold, LQ_Threshold, RS_Threshold and LS_Threshold are 0, and that $N_W$ is very large so that it includes all scan cycles in the prompt interval.

The completion of single-key inputs makes it possible for the calibration routine to assign keys to hands, i.e., to determine which hand is used for each primary key (step 706). This is useful in decoding shift key combinations, as described below.

The calibration routine then prompts the user to input various shift key combinations, one at a time. As in the case of individual, unshifted keys, the key prompts are given slowly and in a random order. It is necessary to cover all shift keys, and to assure that each shift key is covered for both hands, but it is not necessary to cover all possible combinations of shift keys and primary keys. A shift key combination is chosen and prompted to the user (step 707). When a key combination is prompted, the sensor receiver scans the sensor data at the scan rate described above with respect to step 502. Having already determined which hand will activate the primary key, it is only necessary to compute aggregate deflection for the hand activating the primary key, as described with respect to step 503. When the cycle having maximum aggregate deflection for the hand having the primary key is found, the sensor data for both hands is saved (step 708) The sensor data for the hand opposite the hand activating the primary key is used as training data for the appropriate Shift, Alt, Ctrl or Cursor key. If more shift keys remain to be prompted (step 709), the calibration routine returns to step 707 to select and prompt another key. When the calibration routine is finished prompting shift key combinations, the "No" branch is taken from step 709.

Having obtained some initial data for each of the keys and shift combinations, the calibration routine then builds a neural network for each hand by assigning an output node for each key determined to have been activated with that hand and additional output nodes for the shift-type keys (step 710). This neural network is then trained with the sensor data saved as described above using a back propagation training algorithm (step 711).

Figure 8:
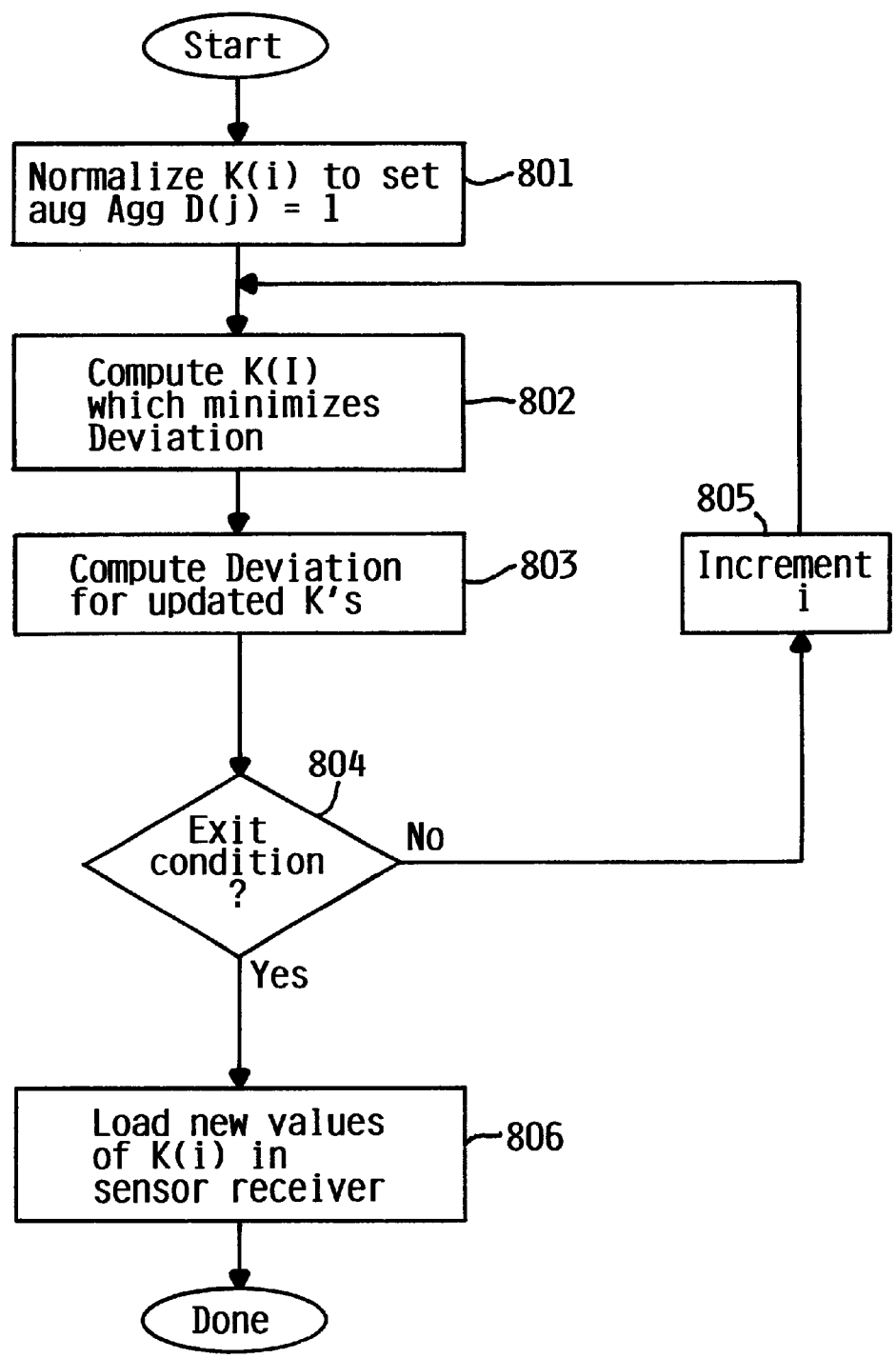
FIG. 8 is a flow diagram showing in greater detail the steps involved in setting the sensor coefficients, according to the preferred embodiment.

The calibration routine then determines and sets values for the sensor deflection coefficients K(i) (shown in FIG. 7 as step 712, and illustrated in greater detail in FIG. 8). Ideally, coefficients K(i) are chosen such that the peak aggregate deflection observed for each virtual keystroke is the same. However, with 14 sensors (coefficients K(i)) in each hand and approximately 21–22 keys (not including shift keys), it is impossible to guarantee a perfect solution, and a rough equalization of aggregate deflection is sufficient. Any of various linear programming or other techniques might be used to obtain an acceptable set of K(i) values, the algorithm described below as a preferred embodiment being but a single example of such a technique. The values of K(i) are computed separately for the sensors of each hand; in the procedure below, only one hand computation is described, it being understood that this is repeated for the other hand.

Initially, a measure of "goodness" of a set of coefficients is established. The peak aggregate deflection for each keystroke is arbitrarily selected to be normalized to a target value of 1, and a measure of deviation is defined as:

$$\text{Deviation} = \Sigma(AggD(j)-1)^2 \qquad (4)$$

where AggD(j) is the average peak aggregate deflection (as defined in Eq (1)) for keystroke j as detected by the sensor receiver during the previous calibration phases. The calibration routine will attempt to adjust the coefficients K(i) so as to minimize the value of Deviation, as defined in Eq. (4).

Referring to FIG. 8, the K(i) values are initially normalized so that the average peak aggregate deflection of all keys is 1 (step 801). The average for all keys is determined by summing the peak aggregate deflection of each key (as determined in the first stage of calibration) and dividing by M, the number of keys activated by the particular hand. If the individual K(i) values are multiplied by the inverse of this number, the average will be 1. Therefore step 801 performs the following assignment:

$$K(i) <== K(i) \times M / \Sigma AggD(j) \qquad (5)$$

For purposes of equalizing the K(i) values, the values of peak resistance and nominal resistance for each sensor and keystroke are known and fixed by the previous calibration phases. Therefore, Eq. (1) can be expressed as a linear equation in which the various $[R(i)-R_0(i)]^2$ terms are constants and K(i) is considered a variable. Since R(i) is different for each sensor and for each key that was activated by the user, the constants $[R(i)-R_0(i)]^2$ are expressed as RS(i,j), where i represents the sensor and j represents the key. Equation (1) can then be rewritten as:

$$AggD(j) = \sum_{i=1}^{N} K(i) \times RS(i, j) \qquad (6)$$

and Eq. (4) can be rewritten as:

$$\text{Deviation} = \sum_{j=1}^{M} \left(\left(\sum_{i=1}^{N} K(i) \times RS(i, j)\right) - 1\right)^2 \qquad (7)$$

Deviation is therefore a function of N variables (the N different values of K(i)). If an arbitrary value of i is chosen (designated I) and all values of K(i) except K(I) are held constant, then Deviation according to Eq. 7 reduces to a positive quadratic function of K(I) which can be differentiated to locate the function's minimum value. E.g., Eq. (6) becomes:

$$AggD(j) = K(I) \times RS(I, j) + \sum_{i=1, i \neq I}^{N} K(i) \times RS(i, j) \qquad (8)$$

where the summation is a constant. Equation (7) becomes:

$$\text{Deviation} = \sum_{j=1}^{M} \left( K(I) \times RS(I, j) + \left(\sum_{i=1, i \neq I}^{N} K(i) \times RS(i, j)\right) - 1 \right)^2 \qquad (9)$$

For simplicity of expression, the inner summation term less 1 (which is a constant which is different for each value of j) is designated $-C(j)$. Equation (9) then reduces to:

$$\text{Deviation} = K(I)^2 \sum_{j=1}^{M} RS(I, j)^2 - K(I) \sum_{j=1}^{M} 2RS(I, j)C(j) + \sum_{j=1}^{M} C(j)^2 \qquad (10)$$

The derivative of Deviation with respect to K(I) is then:

$$\text{Deviation}' = 2K(I) \sum_{j=1}^{M} RS(I, j)^2 - \sum_{j=1}^{M} 2RS(I, j)C(j) \qquad (11)$$

And Deviation reaches a minimum value when:

$$K(I) = \sum_{j=1}^{M} RS(I, j)C(j) \Big/ \sum_{j=1}^{M} RS(I, j)^2 \qquad (12)$$

Referring to FIG. 8, at step 802, K(I) is set to the value of Eq. 12 to minimize Deviation. The new resultant value of Deviation is computed for the new value of K(I) (step 803). The calibration routine then determines whether an exit condition is present (step 804). An exit condition is preferably one of either (a) a predetermined number of iterations through the loop of steps 802–805; or (b) the Deviation is below some pre-determined value. If the exit condition is not met, the "No" branch is taken from step 804. In this case, the value i is incremented so that in the next iteration of the loop, a new coefficient K(I+1) will be adjusted to minimize total Deviation (step 805). The calibration routine then performs steps 802–804 with respect to the new value of i. If the exit condition is met, the "Yes" branch is taken from step 804. Having determined a set of K(i) values, the calibration routine passes these to the sensor receiver for use in computing aggregate deflection (step 806).

The calibration routine directs the sensor receiver to initially set $N_W$ at the lowest possible setting, corresponding to a fast typist (step 713). The value of $N_W$ may be adjusted in later calibration steps. Setting $N_W$ low may have the effect of detecting double keystrokes where only a single key is intended, but it is initially set low in order to avoid missing keystrokes. I.e., in the calibration stages, it is better to detect double keystrokes (which can be accounted for) than to ignore keystrokes altogether.

The calibration routine also determines initial values for RQ_Threshold, RS_Threshold, LQ Threshold and LS Threshold from the sensor data obtained previously (step 714). These initial value are set rather low to avoid ignoring any necessary data. For example, RQ_Threshold might be set at 10% of the lowest aggregate deflection of any of the keys activated by the right hand (using the new K(i) values), RS_Threshold might be set at 10% of the lowest aggregate deflection of any of the shift keys in the right hand, and so forth.

The calibration routine then passes to a more difficult stage, in which the user is prompted to input short words or 3 or 4 letters each. The purpose of this exercise is to further refine the neural network training data by obtaining training input under conditions where multiple letters are input in sequence. However, by limiting the sequence to short words, the probability of user input error is low, and it is possible to analyze each word before going on to the next. The calibration routine thus prompts the user to type a short word from a list of such words used for calibration (step 715). The words are selected from the list at random. Thus user types the input in response to the prompt, and then pauses and waits for system feedback.

After receiving each short word, the calibration routine processes the input (step 716). The sensor receiver processes input using the procedure of FIG. 5 with the K(i), initial threshold and $N_W$ parameter values determined in steps 712–714, exactly as if the user were entering real data. The calibration routine uses the neural network as trained in step 711 to decode each set of sensor data (corresponding to a key activation) coming from the sensor receiver in the prompt interval.

The decoded key data output from the neural network is then compared to the letters of the word with which the user was prompted. There are four possibilities: (a) the decoded key output is the same as the prompt word, i.e., no error was detected; (b) all letters of the prompt word were present in the decoded key word, but at least one of the letters appeared as a double letter (or even a triple letter); (c) all letters of the prompt word were present in the decoded key word, plus one or more unrelated letters at a low aggregate deflection value; and (d) all other errors, including probable user error. In the case of (b), it is probable that the user entered the data correctly, but that $N_W$ is set too low for the user's typing speed. In the case of (c), it is probable that the user entered the data correctly, but that the applicable threshold is set too low for the user.

In case of (d), indicating a probable user error, the "Yes" branch is taken from step 717, and the user is prompted to again input the same word (step 718). In the case of (a), (b) or (c), the user is assumed to have input correct data, the "No" branch is taken from step 718, and the sensor data is saved for later use (step 719). If more words remain to be prompted, the "Yes" branch is taken from step 720 and the calibration routine selects another word prompt (at step 715). When all the words of the exercise have been completed, the "No" branch is taken from step 720.

The calibration routine may now adjust several parameters. If there were any words having double letters, $N_W$ may need to be adjusted upwards (step 721). $N_W$ is adjusted as follows. For each occurrence of a double letter, the letter having the highest aggregate deflection is considered the true letter, and the other occurrence is considered an error. The difference (in number of cycles) between each adjacent letter (neglecting the erroneous double letters) of each word is computed. $N_W$ is then incremented by 1, and the number of errors for this new value of $N_W$ is totaled. The new value may be sufficiently large to remove one or more double letter errors, i.e., if the new value of $N_W$ had been used by the sensor receiver when the trial words were input, the receiver would not have detected double letters because both are within the same window. However, it may also increase the number of errors. In totaling the number of errors, any difference in number of cycles between adjacent letters of less than $3N_W$ is also assumed to be an error. This is done because as $N_W$ gets larger, there is some probability that the windows of the adjacent letters would have interfered with each other, so that only one letter would have been detected by the virtual key detector, had the virtual key detector used the new larger value of $N_W$. At $3N_W$, this probability is still fairly low, but a conservative value of $N_W$ is sought in the current calibration phase. Adjusting $N_W$ to a desired value amounts to iteratively incrementing $N_W$ until all double letter errors disappear, or until the number of errors starts to increase as a result of assumed errors from adjacent character interference, whichever occurs first.

In a similar manner, RQ_Threshold and LQ_Threshold may in adjusted to reduce errors involving extra unrelated letters at low aggregate deflection value (step 722). Starting with the right hand, RQ_Threshold is iteratively incremented until all extra letters at low aggregate deflection value detected from the right hand disappear, or until its value reaches one-half the aggregate deflection value of the correctly entered letter from the right hand having lowest aggregate deflection value, whichever occurs first. If RS_Threshold is less than the adjusted value of RQ_Threshold, RS_Threshold is set equal to RQ_Threshold (and similarly for LS_Threshold).

The sensor data from keys which have not been eliminated as errors is then used as additional training data to update the neural network. I.e., the network is again trained with the backpropagation algorithm using the additional data (step 723). Because this data was entered as a string of characters, it is likely that this data will approximate user entry conditions under actual use to a greater degree than the entry of single characters, as in the first phase of calibration.

The calibration routine then passes to a final and still more difficult stage, in which the user is prompted to type one or more text passages, such as sentences or paragraphs. The purpose of this exercise is to further refine the neural network training data by obtaining training input under realistic input conditions, and to obtain a better measure of $N_W$ and the thresholds. The calibration routine thus displays one or more text passages, and allows the user to type the passage(s) (step 724).

Unless the user is a very accurate typist, it is likely that the user will make some errors in entering an entire paragraph. Therefore, input is not rejected simply because an error was found. The calibration routine will attempt to match the decoded character stream with the prompted text (step 725). To the extent that characters match, the sensor data which produced these characters is used as additional training data for training the neural network. Specifically, the backpropagation algorithm is again used to train the neural network with the additional data (step 726).

As in the previous calibration phase, any double letters or letters having very low aggregate deflection value are used to further refine the $N_W$ parameter and the thresholds, as described above. However, since this will be the final calibration phase, it is possible to use more aggressive parameter values to minimize errors. Specifically, when adjusting $N_W$, any difference in number of cycles between adjacent letters of less than $2N_W$ (rather than $3N_W$) is assumed to be an error, which may cause $N_W$ to be slightly higher (step 727). When adjusting the thresholds, the thresholds are iteratively increased until all low aggregate deflection letters are removed or until the threshold value reaches the aggregate deflection value of the correctly entered letter from the corresponding hand having lowest aggregate deflection value, whichever occurs first (step 728). This completes the calibration and training.

Although an initial calibration and training routine is described above for a neural network key decoder, it would optionally be possible to continually or on a periodic basis collect additional training data from the user during actual use, and to use this additional data for training the neural network. For example, any typed text which the user does not correct may be assumed accurately decoded, whereas typed text which is corrected is suspect and should not be used as training data. Periodic re-training of the neural network by backpropagation with the additional training data helps to further refine the accuracy of the network It may be asked, why a multi-stage calibration process is used as described above? Why not just ask the user to type a text paragraph as in the final stage? The problem lies in the fact that the user can make mistakes, and one doesn't know how fast the user will type. If one could be assured that the user would type the text paragraph at a known rate and without error, then the earlier stages would have been superfluous. As it is, one can assume that the first and second stages will be performed without error (hence assignment of keys to hands is correct, as is the gross training of the neural network). Occasional user errors during the more difficult tasks will therefore probably be detected and rejected, rather than used as a basis for further training data.

Preferably, calibration parameters and neural network parameters are saved in profile 323, and are re-loaded every time the system is re-initialized or the same user puts on the data glove for data entry, so that full recalibration is not necessary. It will be expected that when a data glove is removed from the user's hand, and later put on the hand, there may be some variation in the sensor readings due to glove fit, particularly in the sensor values under quiescent conditions. Therefore, it is preferred that whenever the glove is put on the user, the user is prompted to relax the hands in data entry position for 15 seconds so that the system can read the quiescent sensor values. The remaining values in general should not require recalibration with every use. However, it is possible that over time these parameters can change as well. For example, over time a user's disability may become more severe so that the user's finger movements change. In this case, it may occasionally be necessary to perform a full recalibration using the procedure described above.

While a particular calibration procedure has been described herein, it will be appreciated that many variations are possible in the number and type of parameters values which govern the detection of virtual keystrokes and decoding of keys, and in the way these parameter values are calibrated or otherwise derived. The number of stages in a calibration procedure may vary, and could be only one. Furthermore, it is not necessary that all such values be calibrated, and for some values, it may be acceptable to assume a value or to ask the user for an input. E.g., the user may be asked to indicate whether he is a slow, moderate or fast typist, and a value of $N_W$ may be set based on that input alone.

Additional Variations and Embodiments

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Example of signal-bearing media are illustrated in FIG. 2 as memory 202, and in FIG. 3 as memory 302 or as storage device 313.

In the preferred embodiment, the data glove is physically coupled to a small, portable sensor receiver using a wire data cable, which in turn communicates with a general-purpose computer. The virtual keystroke detection function of the sensor interpreter is performed largely by a programmable processor in the sensor receiver, while the key decoding function is performed by a data glove support application emulating a neural network in the general-purpose computer. It will be appreciated that this exemplary embodiment is just one possible way in which function and electronic packaging may be designed, and that many alternatives are possible. For example, the data glove or other sensor device need not be coupled via a cable, and might have an on-board power source such as a small battery and a transmission communications interface such as an infrared or radio frequency link. It would further be possible for the data glove to communicate directly with the general purpose computer, which would perform all sensor interpreting functions. It would further be possible for electronics in a sensor receiver to perform both the virtual keystroke detection and the key decoding functions, and communicate only the decoded keys to the computer, much as a conventional keyboard does. Furthermore, the sensor interpreter may be designed so that there is no clear delineation between virtual keystroke detection and key decoding function. Many other variations are possible.

In the preferred embodiment described herein, the sensors are physically mounted in a glove which fits over the hand of the user. However, it may be possible to construct alternative sensing apparatus of sufficient accuracy and comfort to the user to detect the necessary minute hand motion and provide input to a sensor interpreter, and such sensing apparatus need not necessarily be in the form of a glove which fits over the hand.

In the preferred embodiment, an artificial neural network is used to decode sensor data as individual keystrokes. It will be appreciated that decoding of arbitrary sensor readings as keystrokes falls in the general category of pattern matching, and that any of various pattern matching algorithms, now known or hereafter developed, may alternatively be employed. Furthermore, the neural network described herein as a preferred embodiment is just one example of a neural network which may be employed for this purpose, it being understood that many variations exist in the design of a neural network suitable for decoding sensor data as keystrokes.

In the preferred embodiment, a virtual keystroke detection algorithm employing a window concept is used, wherein a peak aggregate deflection value within a window is assumed to be a keystroke. It will be understood that many variations of virtual keystroke detection are possible. There are many alternative measures of the quantity referred to herein as aggregate deflection value. A peak value may be detected by integration or other means which do not necessarily rely on a fixed sized window. Furthermore, the function of virtual keystroke detection might be integrated with key decoding. For example, assuming sufficient processing power is available, it may be possible to evaluate sensor input from each scan cycle in the decoder (e.g., neural network), which might determine both whether a key has been activated and the type of key activated. Such a system may have greater potential accuracy than that described herein as a preferred embodiment, although it would require very large processor resource (for which reason the embodiment described herein is preferred).

One of the major advantages of an individually configurable sensor interpreter such as a trainable neural network as described above is that the sensor interpreter is capable of interpreting arbitrary combinations of motion of the different parts of the hand as different keystrokes. Specifically, it is not necessary that a finger touch a key or any other object resembling a key, or any object whatsoever. Furthermore, while an assignment of keys to left and right hand neural networks was disclosed above, said assignment approximating a typical QWERTY keyboard, the user could assign any arbitrary set of keys to the left hand and any arbitrary set of keys to the right. Furthermore, it is not necessary that the motion of the hand approximate the touching of a key in any way. It is expected that trained touch typists may wish to move the fingers which correspond to the keys on a keyboard, although limiting the motion as the user's disability permits, but this association of fingers to keys is not required. The user may wish to invent his own arbitrary finger movements to correspond to different keystrokes, and these arbitrary movements, although referred to herein as "virtual keystrokes", need not approximate keystrokes. Making a fist or the "V" sign are examples of movements which might be interpreted as keystrokes.

In the description above, a simulated keyboard data input device has been described as a device for use by individuals with limited hand function. Although it is anticipated that such individuals will derive maximum benefit from the data input device described herein, its use is not necessarily restricted to individuals having limited hand function. Because the present invention readily supports customization to individual capabilities and preferences, it is possible that some individuals having no disability of the hands whatsoever will find that they can enter data more effectively (i.e., either faster, more accurately, with less fatigue, or in some other manner or combination of these factors) using the present invention.

As an additional example of a possible application of the present invention, the sensor interpreter could be trained to recognize the finger movements of a symbolic sign language as text characters or combinations of text characters. Such an application may be useful in the teaching of sign language, whereby the student (user) would receive immediate feedback from the computer.

Although a specific embodiment of the invention has been disclosed along with certain alternatives, it will be recognized by those skilled in the art that additional variations in form and detail may be made within the scope of the following claims:

What is claimed is:

1. A data input apparatus, comprising:
a sensing device containing a plurality of sensors capable of sensing voluntary motion of parts of a human hand of a user; and
a sensor interpreter coupled to said plurality of sensors in said sensing device, said sensor interpreter being configurable to an individual user to recognize different combinations of arbitrary motion of parts of at least one hand of said individual user as activations of respective different keys of a keyboard without requiring said at least one hand to touch another object and without requiring said at least one hand to assume a predetermined configuration with respect to said plurality of sensors.

2. The data input apparatus of claim 1, wherein said sensing device comprises at least one glove fitting said human hand of said user, said plurality of sensors being mounted in said at least one glove.

3. A data input apparatus, comprising:
a sensing device containing a plurality of sensors capable of sensing voluntary motion of parts of a human hand of a user; and
a sensor interpreter coupled to said plurality of sensors in said sensing device, said sensor interpreter being configurable to an individual user to recognize different combinations of arbitrary motion of parts of at least one hand of said individual user as activations of respective different keys of a keyboard without requiring said at least one hand to touch another object;
wherein said sensing device comprises at least one glove fitting said human hand of said user, said plurality of sensors being mounted in said at least one glove;
wherein said plurality of sensors comprise a plurality of strain gauges having variable electrical resistances.

4. The data input apparatus of claim 2, wherein said sensors in said at least one glove are coupled via a cable to a portable sensor receiver attached to the user, said sensor receiver receiving data from said sensors, and communicating data to a digital computing device.

5. A data input apparatus, comprising:
a sensing device containing a plurality of sensors capable of sensing voluntary motion of parts of a human hand of a user; and
a sensor interpreter coupled to said plurality of sensors in said sensing device, said sensor interpreter being configurable to an individual user to recognize different combinations of arbitrary motion of parts of at least one hand of said individual user as activations of respective different keys of a keyboard without requiring said at least one hand to touch another object;
wherein said sensing device comprises at least one glove fining said human hand of said user, said plurality of sensors being mounted in said at least one glove;
wherein said sensors in said at least one glove are coupled via a cable to a portable sensor receiver attached to the user, said sensor receiver receiving data from said sensors, and communicating data to a digital computing device;
wherein at least a portion of said sensor interpreter is contained in said sensor receiver.

6. The data input apparatus of claim 5, wherein said sensor interpreter comprises: (a) a virtual keystroke detector which detects the occurrence of hand movements corresponding to virtual keystrokes by the user, said virtual keystroke detector being contained in said sensor receiver; and (b) a key decoder which decodes information from said plurality of sensors coincident with the detection of virtual keystrokes by said virtual keystroke detector as said keys of a keyboard, said key decoder being contained in said digital computing device.

7. The data input apparatus of claim 4, wherein said sensor receiver communicates with said digital computing device over a transmission interface.

8. The data input apparatus of claim 1, wherein said different combinations of arbitrary motion of said at least one hand are of significantly less magnitude than hand motion typical for activating keys of a keyboard.

9. The data input apparatus of claim 1, wherein said sensor interpreter comprises at least one neural network.

10. The data input apparatus of claim 1, wherein said sensor interpreter comprises: (a) a virtual keystroke detector which detects the occurrence of hand movements corresponding to virtual keystrokes by the user; and (b) a key decoder which decodes information from said plurality of sensors coincident with the detection of virtual keystrokes by said virtual keystroke detector as said keys of a keyboard.

11. The data input apparatus of claim 10, wherein said virtual keystroke detector detects a virtual keystroke as a maximum of a pre-defined deflection measure during a window, said pre-defined deflection measure being a function of data from said plurality of sensors.

12. The data input apparatus of claim 11, wherein said window is configurable to said individual user.

13. The data input apparatus of claim 11, wherein said pre-defined deflection measure is of the formula:

$$\Sigma K(i) \times Fn(sensor\_data(i))$$

where sensor_data(i) is data from an ith sensor of said plurality of sensors, Fn(sensor_data(i)) is a pre-defined function of said sensor_data(i), and K(i) is a coefficient corresponding to the ith sensor of said plurality of sensors, wherein the coefficients K(i) corresponding to each respective sensor are configurable to said individual user.

14. A data input apparatus, comprising:
a sensing device containing a plurality of sensors capable of sensing voluntary motion of parts of a human hand of a user; and
a sensor interpreter coupled to said plurality of sensors in said sensing device, said sensor interpreter being configurable to an individual user to recognize different combinations of arbitrary motion of parts of at least one hand of said individual user as activations of respective different keys of a keyboard without requiring said at least one hand to touch another object;
wherein said sensor interpreter comprises: (a) a virtual keystroke detector which detects the occurrence of hand movements corresponding to virtual keystrokes by the user; and (b) a key decoder which decodes information from said plurality of sensors coincident with the detection of virtual keystrokes by said virtual keystroke detector as said keys of a keyboard;
wherein said key decoder comprises at least one neural network, said neural network being configurable to said individual user.

15. A method for inputting data to a digital device, comprising the steps of:
configuring said digital device to recognize different combinations of arbitrary motion of parts of at least one hand of an individual user as activations of respective different keys of a keyboard, at least some of said different combinations of arbitrary motion of said at least one hand neither touching any other object nor assuming any pre-determined configuration with respect to sensing apparatus for sensing said different combinations of arbitrary motion of parts of at least one hand;
receiving sensor input sensing motion of parts of a hand of a user in said digital device; and
automatically interpreting said sensor input as a plurality of keystrokes corresponding to keys of a keyboard, said automatically interpreting step being performed by said digital device consistent with a configuration for recognizing hand motion as keys of a keyboard generated by said configuring step.

16. The method for inputting data of claim 15, wherein said sensor input is received from a plurality of sensors mounted in at least one glove fitting said hand of said user.

17. A method for inputting data to a digital device, comprising the steps of:
configuring said digital device to recognize different combinations of arbitrary motion of parts of at least one hand of an individual user as activations of respective different keys of a keyboard, at least some of said different combinations of arbitrary motion of said at least one hand not touching any other object;
receiving sensor input sensing motion of parts of a hand of a user in said digital device; and
automatically interpreting said sensor input as a plurality of keystrokes corresponding to keys of a keyboard, said automatically interpreting step being performed by said digital device consistent with a configuration for recognizing hand motion as keys of a keyboard generated by said configuring step;
wherein said sensor input is received from a plurality of sensors mounted in at least one glove fitting said hand of said user;
wherein said plurality of sensors comprise a plurality of strain gauges having variable electrical resistances.

18. The method for inputting data of claim 15, wherein said different combinations of arbitrary motion of said at least one hand are of significantly less magnitude than hand motion typical for activating keys of a keyboard.

19. The method for inputting data of claim 15, wherein said step of automatically interpreting said sensor input as a plurality of keystrokes comprises processing said sensor input with at least one artificial neural network, said artificial neural network being configured by said configuring step.

20. The method for inputting data of claim 15, wherein said step of automatically interpreting said sensor input as a plurality of keystrokes comprises the steps of:
detecting the occurrence of hand movements corresponding to virtual keystrokes by said user; and
decoding sensor data from said plurality of sensors, said sensor data being coincident with the detection of virtual keystrokes by said detecting step, as said keystrokes corresponding to keys of a keyboard.

21. The method for inputting data of claim 20, wherein said step of detecting the occurrence of hand movements corresponding to virtual keystrokes comprises detecting maxima of a pre-defined deflection measure during respective windows, said pre-defined deflection measure being a function of data from said plurality of sensors.

22. The method for inputting data of claim 21, wherein said window is configured in said configuring step.

23. The method for inputting data of claim 21, wherein said pre-defined deflection measure is of the formula:

$$\Sigma K(i) \times Fn(sensor\_data(i))$$

where sensor_data(i) is data from an ith sensor of said plurality of sensors, Fn(sensor_data(i)) is a pre-defined function of said sensor_data(i), and K(i) is a coefficient corresponding to the ith sensor of said plurality of sensors, wherein the coefficients K(i) corresponding to each respective sensor are configured in said configuring step.

24. A program product for managing the input of data to a digital device, comprising:
a plurality of processor executable instructions recorded on signal-bearing media, wherein said instructions, which executed by at least one processor of said digital device, cause the device to perform the steps of:
(a) configuring said digital device to recognize different combinations of arbitrary motion of parts of at least one hand of an individual user as activations of respective different keys of a keyboard, at least some of said different combinations of arbitrary motion of said at least one hand neither touching any other object nor assuming any pre-determined configuration with respect to sensing apparatus for sensing said different combinations of arbitrary motion of parts of at least one hand;
(b) receiving sensor input sensing motion of parts of a hand of a user in said digital device; and
(c) automatically interpreting said sensor input as a plurality of keystrokes corresponding to keys of a keyboard, said automatically interpreting step being performed by said digital device consistent with a configuration for recognizing hand motion as keys of a keyboard generated by said configuring step.

25. The program product of claim 24, wherein said sensor input is received from a plurality of sensors mounted in at least one glove fitting said hand of said user.

26. The program product of claim 25, wherein said plurality of sensors comprise a plurality of strain gauges having variable electrical resistances.

27. The program product of claim 24, wherein said different combinations of arbitrary motion of said at least one hand are of significantly less magnitude than hand motion typical for activating keys of a keyboard.

28. The program product of claim 24, wherein said step of automatically interpreting said sensor input as a plurality of keystrokes comprises processing said sensor input with at least one artificial neural network, said artificial neural network being configured by said configuring step.

29. The program product of claim 24, wherein said step of automatically interpreting said sensor input as a plurality of keystrokes comprises the steps of:
detecting the occurrence of hand movements corresponding to virtual keystrokes by said user; and
decoding sensor data from said plurality of sensors, sensor data being coincident with the detection of virtual keystrokes by said detecting step, as said keystrokes corresponding to keys of a keyboard.

30. The program product of claim 29, wherein said step of detecting the occurrence of hand movements corresponding to virtual keystrokes comprises detecting maxima of a pre-defined deflection measure during respective windows, said pre-defined deflection measure being a function of data from said plurality of sensors.

31. The program product of claim 30, wherein said window is configured in said configuring step.

32. A program product for managing the input of data to a digital device, comprising:
a plurality of processor executable instructions recorded on signal-bearing media, wherein said instructions, which executed by at least one processor of said digital device, cause the device to perform the steps of:
(a) configuring said digital device to recognize different combinations of arbitrary motion of parts of at least one hand of an individual user as activations of respective different keys of a keyboard, at least some of said different combinations of arbitrary motion of said at least one hand not touching any other object;
(b) receiving sensor input sensing motion of parts of a hand of a user in said digital device; and
(c) automatically interpreting said sensor input as a plurality of keystrokes corresponding to keys of a keyboard, said automatically interpreting step being performed by said digital device consistent with a configuration for recognizing hand motion as keys of a keyboard generated by said configuring step;
wherein said step of automatically interpreting said sensor input as a plurality of keystrokes comprises the steps of:
detecting the occurrence of hand movements corresponding to virtual keystrokes by said user; and
decoding sensor data from said plurality of sensors, said sensor data being coincident with the detection of virtual keystrokes by said detecting step, as said keystrokes corresponding to keys of a keyboard;
wherein said step of detecting the occurrence of hand movements corresponding to virtual keystrokes comprises detecting maxima of a pre-defined deflection measure during respective windows, said pre-defined deflection measure being a function of data from said plurality of sensors;
wherein said pre-defined deflection measure is of the formula:

$$\Sigma K(i) \times Fn(sensor\_data(i))$$

where sensor_data(i) is data from an ith sensor of said plurality of sensors, Fn(sensor_data(i)) is a pre-defined function of said sensor_data(i), and K(i) is a coefficient corresponding to the ith sensor of said plurality of sensors, wherein the coefficients K(i) corresponding to each respective sensor are configured in said configuring step.

33. A program product for managing the input of data to a digital device, comprising:
a plurality of processor executable instructions recorded on signal-bearing media, wherein said instructions, which executed by at least one processor of said digital device, cause the device to perform the steps of:
(a) configuring said digital device to recognize different combinations of arbitrary motion of parts of at least one hand of an individual user as activations of respective different keys of a keyboard, at least some of said different combinations of arbitrary motion of said at least one hand not touching any other object;
(b) receiving sensor input sensing motion of parts of a hand of a user in said digital device; and
(c) automatically interpreting said sensor input as a plurality of keystrokes corresponding to keys of a keyboard, said automatically interpreting step being performed by said digital device consistent with a configuration for recognizing hand motion as keys of a keyboard generated by said configuring step;

wherein said program product comprises a first portion for executing on a processor of a portable sensor receiver device attached to said user and a second portion for executing on a general purpose computing device.

34. A method for initializing a data input device, comprising the steps of:

determining a quiescent state for a plurality of sensors of said data input device, said sensors sensing motion of parts of at least one human hand of a user;

prompting said user to form a plurality of different virtual keystrokes by voluntary motion of different respective combinations of parts of said at least one hand, a choice of voluntary motion of different respective combinations of parts of said at least one hand being arbitrary with the user;

sensing the user's hand motion responsive to said prompting step with a plurality of sensors;

identifying said plurality of different virtual keystrokes as sensor deviations from said quiescent state for said plurality of sensors; and configuring said data input device to recognize future sensor input similar to sensor deviations from said quiescent state corresponding to said virtual keystrokes identified by said identifying step as the corresponding respective virtual keystrokes.

35. The method for initializing a data input device of step 34, wherein said prompting step is performed in a plurality of stages of progressively increasing complexity.

36. The method for initializing a data input device of step 34, wherein said plurality of sensors are mounted in at least one glove fitting said at least one hand.

37. The method for initializing a data input device of step 34, wherein said step of configuring said data input device comprises training at least one artificial neural network using sensor data from at least some of said sensor deviations identified by said identifying step.

38. The method for initializing a data input device of step 34, wherein said step of configuring said data input device comprises calibrating the size of a window for identifying a peak deflection measure as a virtual keystroke.

39. The method for initializing a data input device of step 34, wherein said step of configuring said data input device comprises calibrating the a plurality of coefficients associated with the output of each respective sensor.

40. The method for initializing a data input device of claim 34, wherein said step of configuring said data input device comprises: (a) configuring a virtual keystroke detector which detects the occurrence of hand movements corresponding to virtual keystrokes by the user; and (b) configuring a key decoder which decodes information from said plurality of sensors coincident with the detection of virtual keystrokes by said virtual keystroke detector as said keys of a keyboard.

* * * * *